United States Patent
Tanigawa et al.

(10) Patent No.: US 8,504,317 B2
(45) Date of Patent: Aug. 6, 2013

(54) POSITION CALIBRATION INFORMATION COLLECTING APPARATUS, POSITION CALIBRATION INFORMATION COLLECTING METHOD, AND POSITION CALIBRATION INFORMATION COLLECTING PROGRAM

(75) Inventors: Toru Tanigawa, Kyoto (JP); Katsuyoshi Yamagami, Osaka (JP)

(73) Assignee: Panasonic Corporation, Osaka (JP)

( * ) Notice: Subject to any disclaimer, the term of this patent is extended or adjusted under 35 U.S.C. 154(b) by 242 days.

(21) Appl. No.: 13/122,477

(22) PCT Filed: Sep. 2, 2010

(86) PCT No.: PCT/JP2010/005397
§ 371 (c)(1),
(2), (4) Date: Apr. 4, 2011

(87) PCT Pub. No.: WO2011/027557
PCT Pub. Date: Mar. 10, 2011

(65) Prior Publication Data
US 2011/0184685 A1    Jul. 28, 2011

(30) Foreign Application Priority Data
Sep. 4, 2009    (JP) .................................. 2009-204385

(51) Int. Cl.
*G01C 9/00* (2006.01)
*G06K 9/00* (2006.01)
*G06K 9/36* (2006.01)
*G06K 9/20* (2006.01)

(52) U.S. Cl.
USPC ................... 702/95; 702/94; 702/150; 356/3

(58) Field of Classification Search
USPC ..... 702/95, 94, 104, 150, 152, 153; 356/4.01, 356/3; 382/106
See application file for complete search history.

(56) References Cited

U.S. PATENT DOCUMENTS
6,571,193 B1    5/2003   Unuma et al.
6,925,403 B2 *  8/2005   Nowak ............................ 702/94
(Continued)

FOREIGN PATENT DOCUMENTS
JP        10-113343    5/1998
JP        11-32325     2/1999
(Continued)

OTHER PUBLICATIONS
International Preliminary Report on Patentability issued Apr. 19, 2012 in International (PCT) Application No. PCT/JP2010/005397.
(Continued)

*Primary Examiner* — Marc Armand
*Assistant Examiner* — Ricky Ngon
(74) *Attorney, Agent, or Firm* — Wenderoth, Lind & Ponack, L.L.P.

(57) ABSTRACT

A person is detected by an observer device. A person detection history is recorded in a person detection history database. A position where the person is detected for the first time is estimated by a first-time detection position estimating unit, to be stored in a first-time detection position history database. The position of the door of the room in terms of local coordinates is estimated by a doorway position estimating unit. The calibration information as to the position of the observer device is calculated by a position calibration information calculating unit based on the door position in terms of local coordinates and that in terms of global coordinates.

6 Claims, 23 Drawing Sheets

U.S. PATENT DOCUMENTS

| | | | |
|---|---|---|---|
| 8,031,120 B2 * | 10/2011 | Smith et al. | 342/451 |
| 2003/0208335 A1 | 11/2003 | Unuma et al. | |
| 2004/0263388 A1 | 12/2004 | Krumm et al. | |
| 2005/0258957 A1 | 11/2005 | Krumm et al. | |
| 2005/0270235 A1 | 12/2005 | Krumm et al. | |
| 2005/0270236 A1 | 12/2005 | Krumm et al. | |
| 2007/0208736 A1 * | 9/2007 | Tanigawa et al. | 707/5 |
| 2009/0043504 A1 * | 2/2009 | Bandyopadhyay et al. | 701/213 |

FOREIGN PATENT DOCUMENTS

| | | |
|---|---|---|
| JP | 2001-4330 | 1/2001 |
| JP | 2003-284059 | 10/2003 |
| JP | 2004-30445 | 1/2004 |
| JP | 2005-24540 | 1/2005 |
| JP | 2005-257644 | 9/2005 |
| JP | 2007-333998 | 12/2007 |
| JP | 2008-131176 | 6/2008 |
| JP | 2008-225734 | 9/2008 |
| JP | 2009-129049 | 6/2009 |
| WO | 02/21441 | 3/2002 |

OTHER PUBLICATIONS

International Search Report issued Oct. 12, 2010 in International (PCT) Application No. PCT/JP2010/005397.

* cited by examiner

Fig. 3A

| OBSERVATION ID | TIME | LOCAL COORDINATE (x, y) | COLOR FEATURE INFORMATION |
|---|---|---|---|
| CAM_001 | 2008/09/02_12:00:01 | (50,550) | RED |
| CAM_002 | 2008/09/02_12:00:02 | (150,350) | RED |
| CAM_003 | 2008/09/02_12:00:03 | (250,150) | RED |
| CAM_004 | 2008/09/02_12:00:04 | (450,150) | RED |
| CAM_005 | 2008/09/02_12:00:04 | (1050,350) | WHITE |
| CAM_006 | 2008/09/02_12:00:05 | (650,150) | RED |
| CAM_007 | 2008/09/02_12:00:05 | (850,250) | WHITE |
| CAM_008 | 2008/09/02_12:00:06 | (850,150) | RED |
| CAM_009 | 2008/09/02_12:00:06 | (750,150) | WHITE |
| CAM_010 | 2008/09/02_12:00:07 | (950,150) | RED |
| CAM_011 | 2008/09/02_12:00:07 | (750,350) | WHITE |
| CAM_012 | 2008/09/02_12:00:08 | (1050,350) | RED |
| CAM_013 | 2008/09/02_12:00:08 | (750,350) | WHITE |
| CAM_014 | 2008/09/02_12:00:09 | (750,350) | WHITE |
| CAM_015 | 2008/09/02_12:00:10 | (750,350) | WHITE |
| CAM_016 | 2008/09/02_12:00:10 | (250,750) | RED |
| CAM_017 | 2008/09/02_12:00:11 | (750,350) | WHITE |
| CAM_018 | 2008/09/02_12:00:11 | (150,650) | RED |
| ... | ... | ... | ... |

Fig. 3B

| OBSERVATION ID | TIME | LOCAL COORDINATE (x, y) | TAG ID |
|---|---|---|---|
| TAG_001 | 2008/09/02_12:00:01 | (0, -600) | 001 |
| TAG_002 | 2008/09/02_12:00:02 | (100, -400) | 001 |
| TAG_003 | 2008/09/02_12:00:03 | (200, -200) | 001 |
| TAG_004 | 2008/09/02_12:00:04 | (400, -200) | 001 |
| TAG_005 | 2008/09/02_12:00:04 | (1000, -400) | 002 |
| TAG_006 | 2008/09/02_12:00:05 | (600, -200) | 001 |
| TAG_007 | 2008/09/02_12:00:05 | (800, -300) | 002 |
| TAG_008 | 2008/09/02_12:00:06 | (800, -200) | 001 |
| TAG_009 | 2008/09/02_12:00:06 | (700, -200) | 002 |
| TAG_010 | 2008/09/02_12:00:07 | (900, -200) | 001 |
| TAG_011 | 2008/09/02_12:00:07 | (700, -400) | 002 |
| TAG_012 | 2008/09/02_12:00:08 | (1000, -400) | 001 |
| TAG_013 | 2008/09/02_12:00:08 | (700, -400) | 002 |
| TAG_014 | 2008/09/02_12:00:09 | (700, -400) | 002 |
| TAG_015 | 2008/09/02_12:00:10 | (700, -400) | 002 |
| TAG_016 | 2008/09/02_12:00:10 | (200, -800) | 003 |
| TAG_017 | 2008/09/02_12:00:11 | (700, -400) | 002 |
| TAG_018 | 2008/09/02_12:00:11 | (100, -700) | 003 |
| ... | ... | ... | ... |

Fig. 4A

| OBSERVATION ID | TIME | LOCAL COORDINATE (x, y) | COLOR FEATURE INFORMATION |
|---|---|---|---|
| CAM_001 | 2008/09/02_12:00:01 | (50,550) | RED |
| CAM_005 | 2008/09/02_12:00:04 | (1050,350) | WHITE |
| CAM_016 | 2008/09/02_12:00:10 | (250,750) | RED |

Fig. 4B

| OBSERVATION ID | TIME | LOCAL COORDINATE (x, y) | TAG ID |
|---|---|---|---|
| TAG_001 | 2008/09/02_12:00:01 | (0, -600) | 001 |
| TAG_005 | 2008/09/02_12:00:04 | (1000, -400) | 002 |
| TAG_016 | 2008/09/02_12:00:10 | (200, -800) | 003 |

Fig.5

| ENVIRONMENT ID | GLOBAL COORDINATE (x, y) | ATTRIBUTE | BEHAVIOR |
|---|---|---|---|
| DOOR_001 | (0,600) | DOORWAY | MANUAL OPEN AND CLOSE |
| DOOR_002 | (200,800) | DOORWAY | MANUAL OPEN AND CLOSE |
| DOOR_003 | (1000,400) | DOORWAY | AUTOMATIC OPEN AND CLOSE |
| CHAIR_004 | (700,400) | STAYING POSITION | — |
| DESK_005 | (500,400) | INTRUSION IMPOSSIBLE | — |

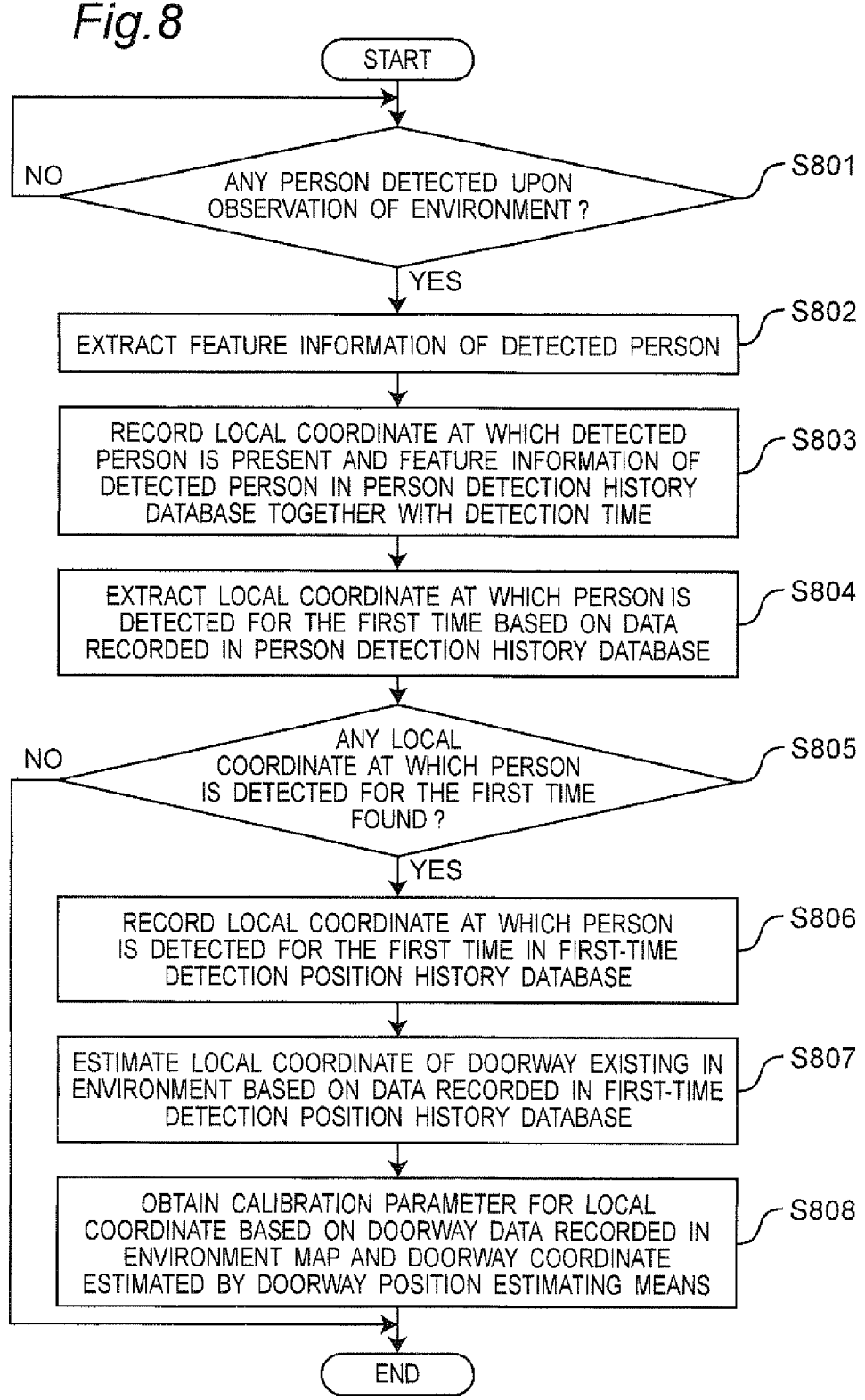

Fig.16A

| OBSERVATION ID | TIME | LOCAL COORDINATE (x, y) | COLOR FEATURE INFORMATION |
|---|---|---|---|
| CAM_012 | 2008/09/02_12:00:08 | (1050,350) | RED |

Fig. 16B

| OBSERVATION ID | TIME | LOCAL COORDINATE (x, y) | TAG ID |
|---|---|---|---|
| TAG_012 | 2008/09/02_12:00:08 | (1000, -400) | 001 |

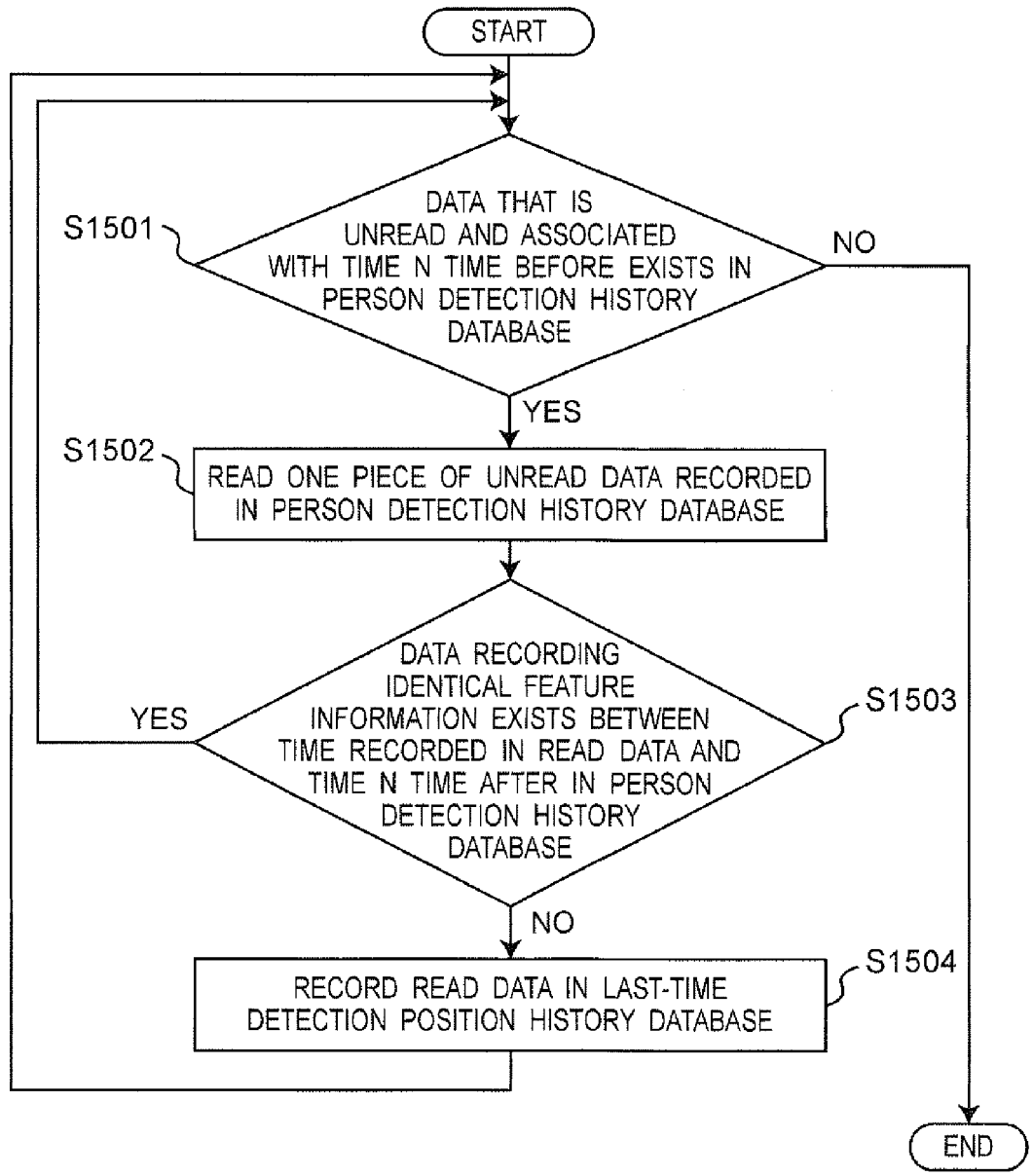

US 8,504,317 B2

POSITION CALIBRATION INFORMATION COLLECTING APPARATUS, POSITION CALIBRATION INFORMATION COLLECTING METHOD, AND POSITION CALIBRATION INFORMATION COLLECTING PROGRAM

TECHNICAL FIELD

The present invention relates to a position calibration information collecting apparatus, a position calibration information collecting method, and a position calibration information collecting program, with which calibration as to the position of an observer device can be performed without the necessity of using a previously prepared marker.

BACKGROUND ART

As observer devices for monitoring people, what are used are cameras, and in some resent cases, UWB (Ultra Wide Band) tags or the like. Normally, when those observer devices are to be used, calibration of the position of the observer devices must previously be performed. In performing the calibration of the position of the observer devices, generally, an artificially created marker is used. Example of the marker for the tag reader includes position tag having stored therein position information. Further, example of the marker for the camera includes two-dimensional barcodes having stored therein position information. Whichever the marker is used for, i.e., for the tag reader or for the camera, it necessitates labor such as storing the position information, and disposing the marker at that position.

On the other hand, there is a technique of using a known object existing in an environment to estimate the self-position of a robot instead of using such an artificial marker (Patent Document 1).

PRIOR ART DOCUMENTS

Patent Document

Patent Document 1: Japanese Unexamined Patent Publication No. 2004-30445

SUMMARY OF INVENTION

Issues to be Resolved by the Invention

However, with the technique of Patent Document 1, it is necessary to have the robot previously learn the three-dimensional shape of the known object. That is, the technique substitutes the known object, though it is not artificial, for the marker. Further, the technique of Patent Document 1 cannot be applied to the UWB tags which are incapable of identifying a three-dimensional shape.

In view of the foregoing, an object of the present invention is to provide a position calibration information collecting apparatus, a position calibration information collecting method, and a position calibration information collecting program, with which calibration as to the position of an observer device for monitoring people can be performed without the necessity of using any marker.

Means for Resolving the Issues

In order to achieve the object noted above, the present invention is structured as follows.

According to a first aspect of the present invention, there is provided a position calibration information collecting apparatus, comprising:

an observer device that acquires feature information as to a person present in an environment having a doorway, local coordinates of a position where the person is detected in a local coordinate space of the environment, and a time when the person is detected, as observation information;

a first-time detection position estimating unit for estimating a position where the person is detected for a first time within the local coordinate space, based on the feature information as to the person, the local coordinates, and the time each observed by the observer device;

a doorway position estimating unit for estimating local coordinates of a doorway position of the doorway in the local coordinate space, based on the position where the person is detected for the first time within the local coordinate space estimated by the first-time detection position estimating unit; and a position calibration information calculating unit for outputting position calibration information for calibration of a position of the observer device, based on global coordinates of the doorway position of the doorway in a global space of the environment and the local coordinates of the doorway position estimated by the doorway position estimating unit.

According to a ninth aspect of the present invention, there is provided a position calibrating apparatus, comprising:

the position calibration information collecting apparatus according to one of the first to eighth aspects; and a calibrating unit for performing calibration as to the position of the observer device based on the position calibration information calculated by the position calibration information calculating unit of the position calibration information collecting apparatus based on the global coordinates of the doorway position of the doorway installed in the global space and the local coordinates of the doorway position.

According to a tenth aspect of the present invention, there is provided a position calibration information collecting apparatus, comprising:

an observer device that acquires feature information as to a person present in an environment having a doorway, local coordinates of a position where the person is detected in local coordinates space of the environment, and a time when the person is detected, as observation information;

a last-time detection position estimating unit for estimating a position where the person is detected for a last time within the local coordinates space, based on the feature information as to the person, the local coordinates, and the time each observed by the observer device;

a doorway position estimating unit for estimating local coordinates of a doorway position of the doorway in the local coordinate space, based on the position where the person is detected for the last time within the local coordinate space estimated by the last-time detection position estimating unit; and a position calibration information calculating unit for outputting position calibration information for calibration of a position of the observer device, based on global coordinates of the doorway position of the doorway in a global space of the environment and the local coordinates of the doorway position estimated by the doorway position estimating unit.

According to an eleventh aspect of the present invention, there is provided a position calibration information collecting method, comprising:

acquiring, by an observer device, feature information as to a person present in an environment having a doorway, local coordinates of a position where the person is detected in a local coordinate space of the environment, and a time when the person is detected, as observation information;

estimating, by a first-time detection position estimating unit, a position where the person is detected for a first time within the local coordinate space, based on the feature information as to the person, the local coordinates, and the time each observed by the observer device;

estimating, by a doorway position estimating unit, local coordinates of a doorway position of the doorway in the local coordinate space, based on the position where the person is detected for the first time within the local coordinate space estimated by the first-time detection position estimating unit; and outputting, by a position calibration information calculating unit, position calibration information for calibration of a position of the observer device, based on global coordinates of the doorway position of the doorway in a global space of the environment and the local coordinates of the doorway position estimated by the doorway position estimating unit.

According to a twelfth aspect of the present invention, there is provided a position calibration information collecting program for causing a computer to execute functions of:

acquiring, by an observer device, feature information as to a person present in an environment having a doorway, local coordinates of a position where the person is detected in a local coordinate space of the environment, and a time when the person is detected, as observation information;

estimating, by a first-time detection position estimating unit, a position where the person is detected for a first time within the local coordinate space, based on the feature information as to the person, the local coordinates, and the time each observed by the observer device;

estimating, by a doorway position estimating unit, local coordinates of a doorway position of the doorway in the local coordinate space, based on the position where the person is detected for the first time within the local coordinate space estimated by the first-time detection position estimating unit; and calculating, by a position calibration information calculating unit, position calibration information for performing calibration as to a position of the observer device, based on global coordinates of the doorway position of the doorway in a global space of the environment and the local coordinates of the doorway position estimated by the doorway position estimating unit.

Effects of the Invention

According to the present invention, it becomes possible to estimate that the position where a person is detected for the first time or the last time is the position of the doorway to a closed environment, and hence to determine the absolute position in terms of the global coordinate system. Thus, by detecting the person, calibration information as to the position of an observer device can be calculated without the necessity of using any marker.

BRIEF DESCRIPTION OF THE DRAWINGS

These and other aspects and features of the present invention will become clear from the following description taken in conjunction with the preferred embodiments thereof with reference to the accompanying drawings, in which:

FIG. 3A is a view showing an example of person detection history information obtained by a camera and stored in a person detection history database of the position calibration information collecting apparatus according to the first embodiment of the present invention;

FIG. 3B is a view showing an example of person detection history information obtained by an Ultra Wide Band tag reader and stored in the person detection history database of the position calibration information collecting apparatus according to the first embodiment of the present invention;

FIG. 4A is a view showing an example of person first-time detection history information obtained by the camera and stored in a first-time detection position history database of the position calibration information collecting apparatus according to the first embodiment of the present invention;

FIG. 4B is a view showing an example of person first-time detection history information obtained by the Ultra Wide Band tag reader and stored in the first-time detection position history database of the position calibration information collecting apparatus according to the first embodiment of the present invention;

FIG. 5 is a view showing an example of an environment map of the position calibration information collecting apparatus according to the first embodiment of the present invention;

FIG. 8 is a flowchart showing an entire procedure performed by the position calibration information collecting apparatus according to the first embodiment of the present invention;

FIG. 16A is a view showing an example of a last-time detection position history database obtained when a camera detects a person for the last time in the position calibration information collecting apparatus according to the second embodiment of the present invention;

FIG. 16B is a view showing an example of a last-time detection position history database obtained when a tag reader detects a person for the last time in the position calibration information collecting apparatus according to the second embodiment of the present invention; and FIG. 17 is a flowchart showing a last-time detection position acquiring process performed by the position calibration information collecting apparatus according to the second embodiment of the present invention.

DESCRIPTION OF EMBODIMENTS

Figure 1:
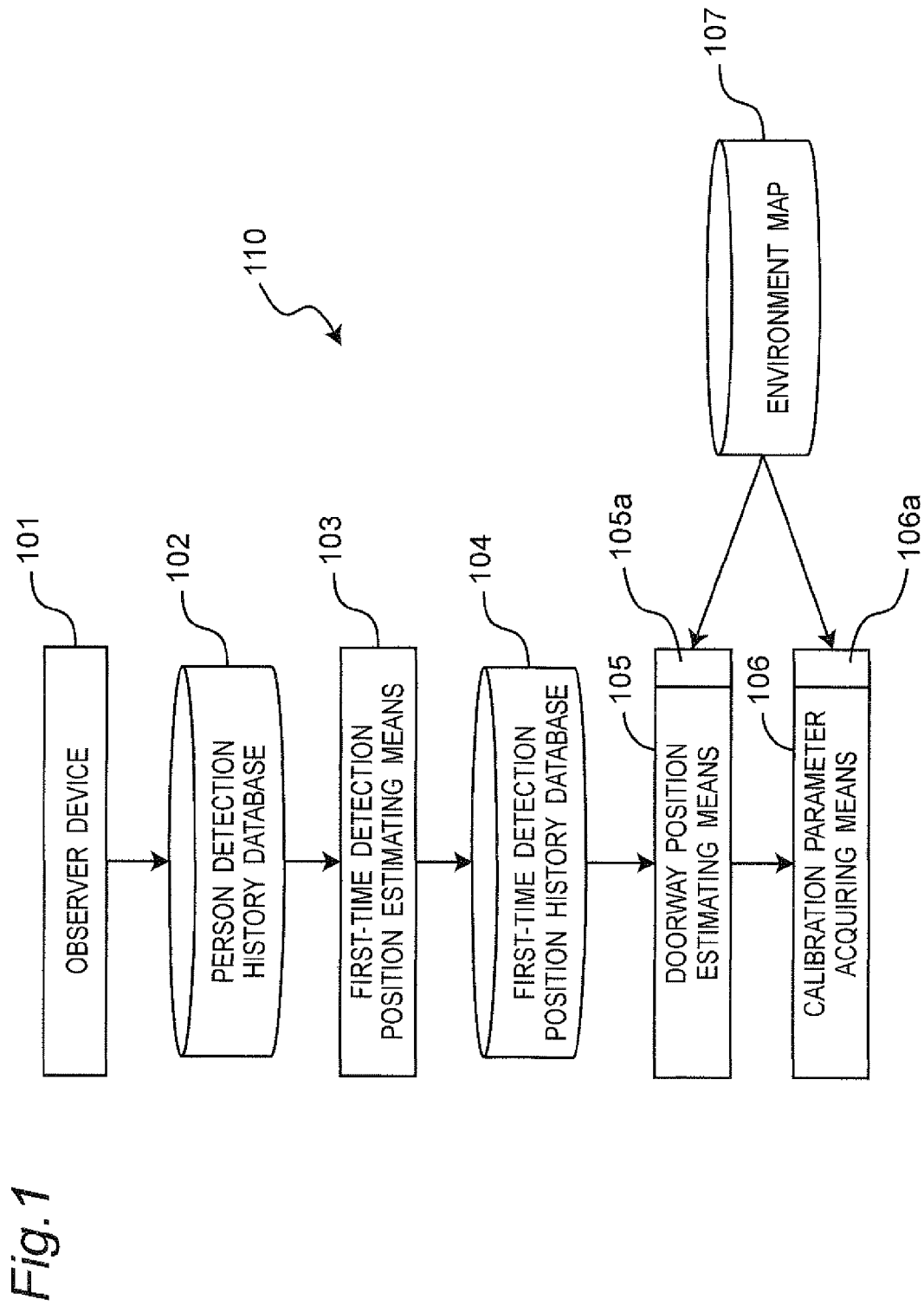
FIG. 1 is a block diagram showing the structure of a position calibration information collecting apparatus according to a first embodiment of the present invention.

In the following, a detailed description will be given of the embodiments of the present invention with reference to the drawings.

Before proceeding to the detailed description of the embodiments of the present invention with reference to the drawings, in the following, various modes for carrying out the present invention will be described.

According to a first aspect of the present invention, there is provided a position calibration information collecting apparatus, comprising:

an observer device that acquires feature information as to a person present in an environment having a doorway, local coordinates of a position where the person is detected in a local coordinate space of the environment, and a time when the person is detected, as observation information;

a first-time detection position estimating unit for estimating a position where the person is detected for a first time within the local coordinate space, based on the feature information as to the person, the local coordinates, and the time each observed by the observer device;

a doorway position estimating unit for estimating local coordinates of a doorway position of the doorway in the local coordinate space, based on the position where the person is detected for the first time within the local coordinate space estimated by the first-time detection position estimating unit; and a position calibration information calculating unit for outputting position calibration information for calibration of a position of the observer device, based on global coordinates of the doorway position of the doorway in a global space of the environment and the local coordinates of the doorway position estimated by the doorway position estimating unit.

According to a second aspect of the present invention, there is provided the position calibration information collecting apparatus according to the first aspect, further comprising:

a person detection history database that stores therein the feature information as to the person, the local coordinates of the person, and the time when the person is detected, each being the observation information acquired by the observer device; and a first-time detection position history database that stores therein by the first-time detection position estimating unit, the position where the person is detected for the first time in the local coordinate space as first-time detection position information, with the time when the person is detected, based on the information stored in the person detection history database, wherein the first-time detection position estimating unit refers to the person detection history database as to each piece of the observation information being acquired by the observer device and being associated with a detection of the person, to determine whether or not any other piece of the observation information that stores feature information identical to the feature information of the observation information is stored in the person detection history database between the time when the person is detected being the observation information and a time a prescribed time before, and when the other observation information storing the identical feature information is not stored in the person detection history database, the first-time detection position estimating unit estimates that the position where the person is detected being the observation information is the position where the person is detected for the first time, and stores the position where the person is detected for the first time in the first-time detection position history database.

According to a third aspect of the present invention, there is provided the position calibration information collecting apparatus according to one of the first and second aspects, wherein the doorway position estimating unit refers to automatic door identification information as to the doorway, as to around the position where the person is detected for the first time in the local coordinate space, to estimate the position where the person is detected for the first time as the local coordinates of the doorway position in the local coordinate space.

According to a fourth aspect of the present invention, there is provided the position calibration information collecting apparatus according to one of the first to third aspects, further comprising:

an environment map storing unit for storing therein the global coordinates of the doorway position of the doorway in the global space of the environment, wherein the position calibration information calculating unit calculates the position calibration information for performing calibration as to the position of the observer device, based on the global coordinates of the doorway position and the local coordinates of the doorway position, using the global coordinates of the doorway position of the doorway in the global space stored in the environment map storing unit.

According to a fifth aspect of the present invention, there is provided the position calibration information collecting apparatus according to one of the first to fourth aspects, wherein the environment map storing unit stores therein automatic door identification information that identifies whether a door at the doorway in the global space automatically opens or the door is manually opened, and the position calibration information calculating unit calculates the position calibration information, based on the automatic door identification information stored in the environment map storing unit, by associating the door at the doorway in terms of the local coordinates and the door at the doorway in terms of the global coordinates to each other.

According to a sixth aspect of the present invention, there is provided the position calibration information collecting apparatus according to the fifth aspect, wherein when there exist a plurality of pairs of local coordinates of the doorway position of the doorway determined to be the doorway where the door at the doorway automatically opens based on the automatic door identification information as the position where the person is detected for the first time, the first-time detection position estimating unit determines that, out of the plurality of positions where the person is detected for the first time, a position located at farthest coordinates from central coordinates of the environment is the local coordinates of the doorway position of the doorway, and when there exist a plurality of pairs of local coordinates of the doorway position of the doorway determined to be the doorway where the door at the doorway is manually opened based on the automatic door identification information as the position where the person is detected for the first time, the first-time detection position estimating unit determines that a barycenter position of the plurality of positions where the person is detected for the first time is the local coordinates of the doorway position of the doorway.

According to a seventh aspect of the present invention, there is provided the position calibration information collecting apparatus according to the fourth aspect, further comprising:

a person detection history database that stores therein the feature information as to the person, the local coordinates of the person, and the time when the person is detected the observation information, each being the observation information acquired by the observer device; and a first-time detection position history database that stores therein by the first-time detection position estimating unit, the position where the person is detected for the first time in the local coordinate space as first-time detection position information, with the time when the person is detected, based on the information stored in the person detection history database, wherein the environment map storing unit further stores therein information as to a position where the person is likely to stay within the global space, the doorway position estimating unit further estimates a position where the person is likely to stay within the local coordinate space, based on the feature information as to the person, the local coordinates of the person, and the time when the person is detected, each being stored in the person detection history database, the first-time detection position history database stores therein by the first-time detection position estimating unit the position where the person is likely to stay within the local coordinate space with the time when the person is detected, the doorway position estimating unit estimates local coordinates of the position where the person is likely to stay in the local coordinate space, based on the position where the person is likely to stay within the local coordinate space stored in the first-time detection position history database, and the position calibration information calculating unit calculates the position calibration information for performing calibration as to the position of the observer device, based on the global coordinates of the position where the person is likely to stay and the local coordinates of the position where the person is likely to stay estimated by the doorway position estimating unit.

According to an eighth aspect of the present invention, there is provided the position calibration information collecting apparatus according to the fourth aspect, further comprising:

a person detection history database that stores therein the feature information as to the person, the local coordinates of the person, and the time when the person is detected the observation information, each being the observation information acquired by the observer device; and a first-time detection position history database that stores therein by the first-time detection position estimating unit, the position where the person is detected for the first time in the local coordinate space as first-time detection position information, with the time when the person is detected, based on the information stored in the person detection history database, wherein the environment map storing unit further stores therein information as to a position where the person is inhibited from intruding, the doorway position estimating unit further estimates a position where the person is inhibited from intruding within the local coordinate space, based on the feature information as to the person, the local coordinates of the person, and the time when the person is detected, each being stored in the person detection history database, the first-time detection position history database stores therein, by the first-time detection position estimating unit, the position where the person is inhibited from intruding within the local coordinate space with the time when the person is detected, the doorway position estimating unit estimates local coordinates of the position where the person is inhibited from intruding in the local coordinate space, based on the position where the person is inhibited from intruding within the local coordinate space stored in the first-time detection position history database, and the position calibration information calculating unit calculates the position calibration information for performing calibration as to the position of the observer device, based on the global coordinates of the position where the person is likely to stay and the local coordinates of the position where the person is inhibited from intruding estimated by the doorway position estimating unit.

According to a ninth aspect of the present invention, there is provided a position calibrating apparatus, comprising:

the position calibration information collecting apparatus according to one of the first to eighth aspects; and a calibrating unit for performing calibration as to the position of the observer device based on the position calibration information calculated by the position calibration information calculating unit of the position calibration information collecting apparatus based on the global coordinates of the doorway position of the doorway installed in the global space and the local coordinates of the doorway position.

According to a tenth aspect of the present invention, there is provided a position calibration information collecting apparatus, comprising:

an observer device that acquires feature information as to a person present in an environment having a doorway, local coordinates of a position where the person is detected in a local coordinate space of the environment, and a time when the person is detected, as observation information;

a last-time detection position estimating unit for estimating a position where the person is detected for a last time within the local coordinate space, based on the feature information as to the person, the local coordinates, and the time each observed by the observer device;

a doorway position estimating unit for estimating local coordinates of a doorway position of the doorway in the local coordinate space, based on the position where the person is detected for the last time within the local coordinate space estimated by the last-time detection position estimating unit; and a position calibration information calculating unit for outputting position calibration information for calibration of a position of the observer device, based on global coordinates of the doorway position of the doorway in a global space of the environment and the local coordinates of the doorway position estimated by the doorway position estimating unit.

According to an eleventh aspect of the present invention, there is provided a position calibration information collecting method, comprising:

acquiring, by an observer device, feature information as to a person present in an environment having a doorway, local coordinates of a position where the person is detected in a local coordinate space of the environment, and a time when the person is detected, as observation information;

estimating, by a first-time detection position estimating unit, a position where the person is detected for a first time within the local coordinate space, based on the feature information as to the person, the local coordinates, and the time each observed by the observer device;

estimating, by a doorway position estimating unit, local coordinates of a doorway position of the doorway in the local coordinate space, based on the position where the person is detected for the first time within the local coordinate space estimated by the first-time detection position estimating unit; and outputting, by a position calibration information calculating unit, position calibration information for calibration of a position of the observer device, based on global coordinates of the doorway position of the doorway in a global space of the environment and the local coordinates of the doorway position estimated by the doorway position estimating unit.

According to a twelfth aspect of the present invention, there is provided a position calibration information collecting program for causing a computer to execute functions of:

acquiring, by an observer device, feature information as to a person present in an environment having a doorway, local coordinates of a position where the person is detected in a local coordinate space of the environment, and a time when the person is detected, as observation information;

estimating, by a first-time detection position estimating unit, a position where the person is detected for a first time within the local coordinate space, based on the feature information as to the person, the local coordinates, and the time each observed by the observer device;

estimating, by a doorway position estimating unit, local coordinates of a doorway position of the doorway in the local coordinate space, based on the position where the person is detected for the first time within the local coordinate space estimated by the first-time detection position estimating unit; and calculating, by a position calibration information calculating unit, position calibration information for performing calibration as to a position of the observer device, based on global coordinates of the doorway position of the doorway in a global space of the environment and the local coordinates of the doorway position estimated by the doorway position estimating unit.

In the following, the embodiments of the present invention will be described with reference to the drawings. Prior to proceeding to the description of the present invention, it is noted that the identical components are denoted by the identical reference symbols throughout the accompanying drawings.

First Embodiment

Description of Structure of Position Calibration Information Collecting Device

FIG. 1 is a view showing the structure of a position calibration information collecting apparatus according to a first embodiment of the present invention.

The position calibration information collecting apparatus according to the first embodiment of the present invention includes an observer device 101, a person detection history database 102 as an example of a person detection history storing means, a first-time detection position estimating means (first-time detection position estimating unit) 103, a first-time detection position history database 104 as an example of a first-time detection position history storing means, a doorway position estimating means (doorway position estimating unit) 105, a calibration parameter acquiring means (calibration parameter acquiring unit) 106 as an example of a position calibration information calculating means for calculating position calibration information, and an environment map database 107 as an example of an environment map storing means.

Here, it is based on the premise that the doorway position estimating means 105 and the calibration parameter acquiring means 106 respectively include structure information referring means 105a and 106a for reading information from the environment map database 107.

Figure 2:
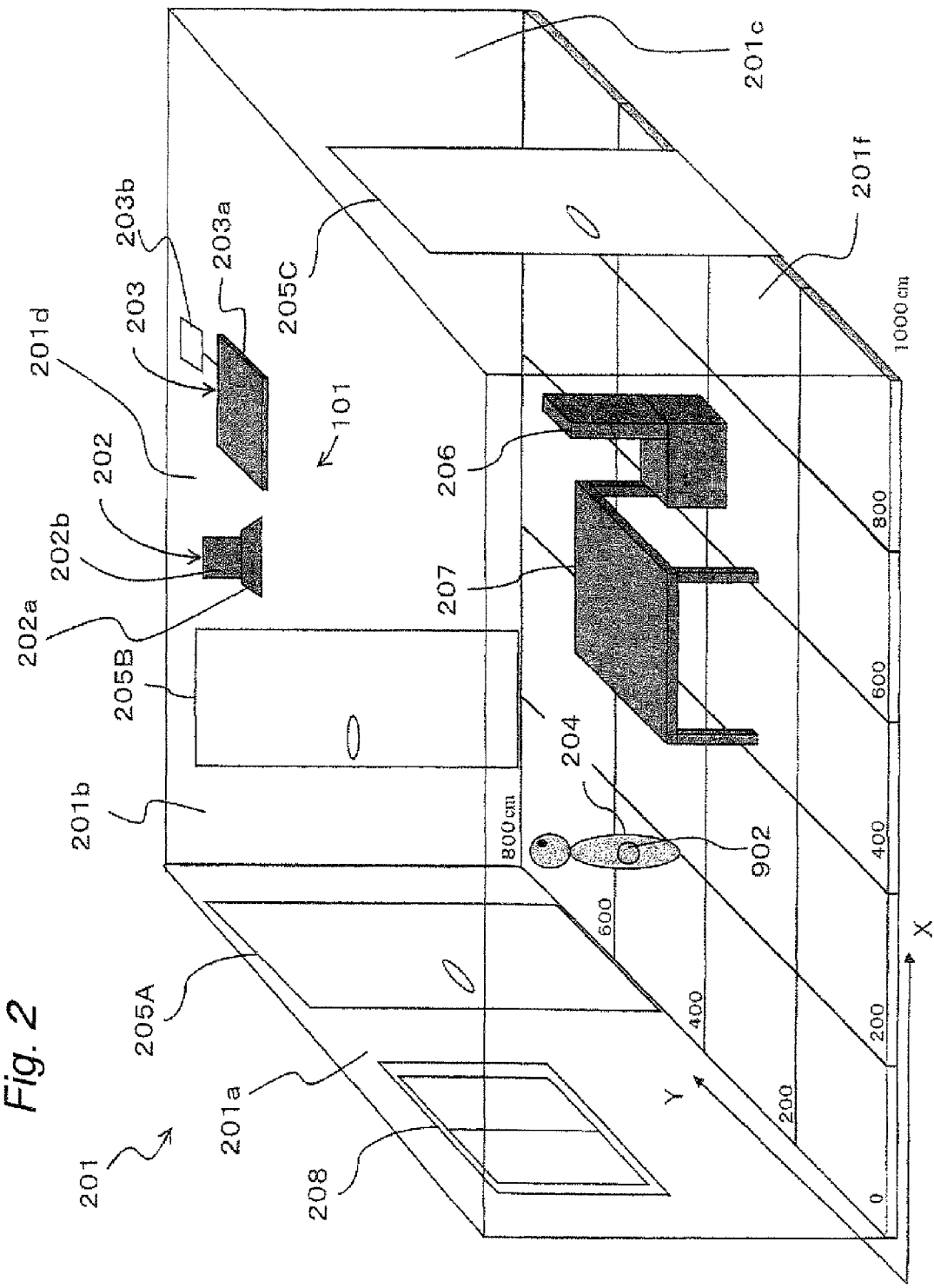
FIG. 2 is a view for describing a room as a living space which is an observation target of the position calibration information collecting apparatus according to the first embodiment of the present invention.

FIG. 2 shows a room 201 as a specific example of a living environment. The room 201 includes a camera 202 and an UWB (Ultra Wide Band) tag reader system 203 (hereinafter referred to as the tag reader 203). The camera 202 and the UWB tag reader system 203 are each an example of the observer device 101, which is a constituent of the position calibration information collecting apparatus according to the first embodiment of the present invention. About the center of the rectangular ceiling 201d of the room 201 in a shape of rectangular parallelepiped, the camera 202 and the tag reader 203 are disposed so as to point right below. There is a person 204 in the room 201 who have entered or will leave the room 201. Note that the number of people entering or leaving the room 201 is not limited, and the present description is given of one arbitrary person as a representative person 204. There are, on a floor 201f, a chair 206 on which the person 204 sits and a desk 207 onto whose disposition region the person 204 cannot intrude. Further, a door 205A, a door 205B, and a door 205C are installed, each of which is an example of a doorway to the room 201 being a closed environment. Hereinafter, an arbitrary door out of the door 205A, the door 205B, and the door 205C in the room 201 is representatively described as the door 205. Here, as an exemplary case, the door 205A and the door 205C are respectively disposed on a pair of walls 201v and 201w of the room 201 opposite to each other, and the door 205B is disposed on a wall 201b connecting between the pair of walls 201a and 201c.

It is to be noted that, though two types of the observer devices which are the camera 202 and the tag reader 203 are installed in the room 201, the present invention is also applicable to a case where either one observer device 101 solely is installed.

In the following, with reference to FIGS. 1 and 2 in association with the flowchart of FIG. 8, a description will be given of the respective constituents FIG. 8 is a flowchart of the entire procedure performed by the position calibration information collecting apparatus (i.e., the position calibration information collecting process).

<Description of Observer Device>

The observer device 101 observes the room 201 every prescribed observation period (e.g., an arbitrary time period of one to two seconds, or 100 ms), to detect a person 204 existing in the room 201. The observer device 101 stores the detection result in the person detection history database 102. When the observer device 101 detects the person 204, the observer device 101 acquires feature information (information representing the feature (feature amount) of being a person) and local coordinates of the detected person 204. Then, the observer device 101 stores the feature information and the local coordinates of the detected person 204, together with the time when the person 204 is detected, in the person detection history database 102. Thus, the person 204 and the time when the person 204 is detected are stored in the person detection history database 102 as being associated with each other. As used herein, the local coordinates are the positional coordinates (e.g., XY coordinates) that represent the position of the person 204 in the room 201 detected by the observer device 101. Accordingly, the local coordinates are dependent on the installation position of the observer device 101, and contain a disposition position error of the observer device 101, with reference to global coordinates being the absolute coordinates of the room 201, of which description will be given later. Therefore, as will be described later, the necessity of calibrating the position arises.

In a case where the camera 202 is employed as the observer device 101, the origin position of the local coordinates can be defined as the pixel at the upper left corner of an image picked up by the camera 202.

In a case where the tag reader 203 is employed as the observer device 101, the origin position of the local coordinates can be defined as the position of any of a plurality of base stations connected to the tag reader 203.

First, a description will be given of the case where the camera 202 is employed as the observer device 101, as one example of the observer device 101. The camera 202 includes an image pickup unit 202a that detects a person 204 and an image processing unit 202b that subjects image data to image processing.

In order to detect a person 204 using the camera 202, the image data acquired by the camera 202 must be subjected to image processing by the image processing unit 202b included in the camera 202. Exemplary method of such image processing is the background differencing technique. Background image data of the room 201 without the presence of a person 204 previously obtained by the camera 202 for preparation is compared by the image processing unit 202b against current image data obtained by the camera 202. Thereafter, the region differing in pixel value is extracted by the image processing unit 202b as a differential region. On the other hand, because the image data may contain noises, in a case where the image processing unit 202b can determine that the differential region is so small to for a person 204, the image processing unit 202b may determine that the differential region is not a person 204. Here, the case where the differential region is so small for a person 204 may be a case where the pixel count of the differential region is equal to or less than a threshold value which is preset based on the minimum pixel count recognizable as a person 204. It is to be noted that the local coordinates of the detected person 204 can be regarded by the image processing unit 202b as the barycenter position of the differential region, for example.

The foregoing is the process of step S801 in the flowchart of FIG. 8. That is, in step S801, when the image processing unit 202b determines that a person 204 is detected using the camera 202, the control proceeds to the process of next step S802. On the other hand, when the image processing unit 202b determines that a person 204 is not detected using the camera 202, the process of step S801 is repeatedly performed until the image processing unit 202b determines that a person 204 is detected. Though not specifically shown in the figure, depending on the situation, when the image processing unit 202b determines that a person 204 is not detected, the position calibration information collecting process may end.

The feature information as to the detected person 204 may be the color distribution of the differential region, for example. Hereinafter, this is referred to as the color feature information. In step S801, the image processing unit 202b determines that a person 204 is detected using the camera 202. Thereafter, in step S802, the image processing unit 202b extracts, as an example of feature information as to the person 204, the color distribution of the differential region which has been recognized as a person 204. Thereafter, the control proceeds to the process of step S803.

Now, a description will be given of a case where the tag reader 203 is employed as the observer device 101, as another example of the observer device 101. The tag reader 203 includes a tag detecting unit 203a that detects a tag, and an information processing unit 203b that calculates the position of the tag based on the information detected by the tag detecting unit 203a.

In order to detect a person 204 using the tag reader 203, it is necessary to previously have a person 204 to carry a tag 902 that contains information representing the feature of being a person 204, and that represents the feature information as to the person (tag ID) as ID data (identification information).

Figure 9:
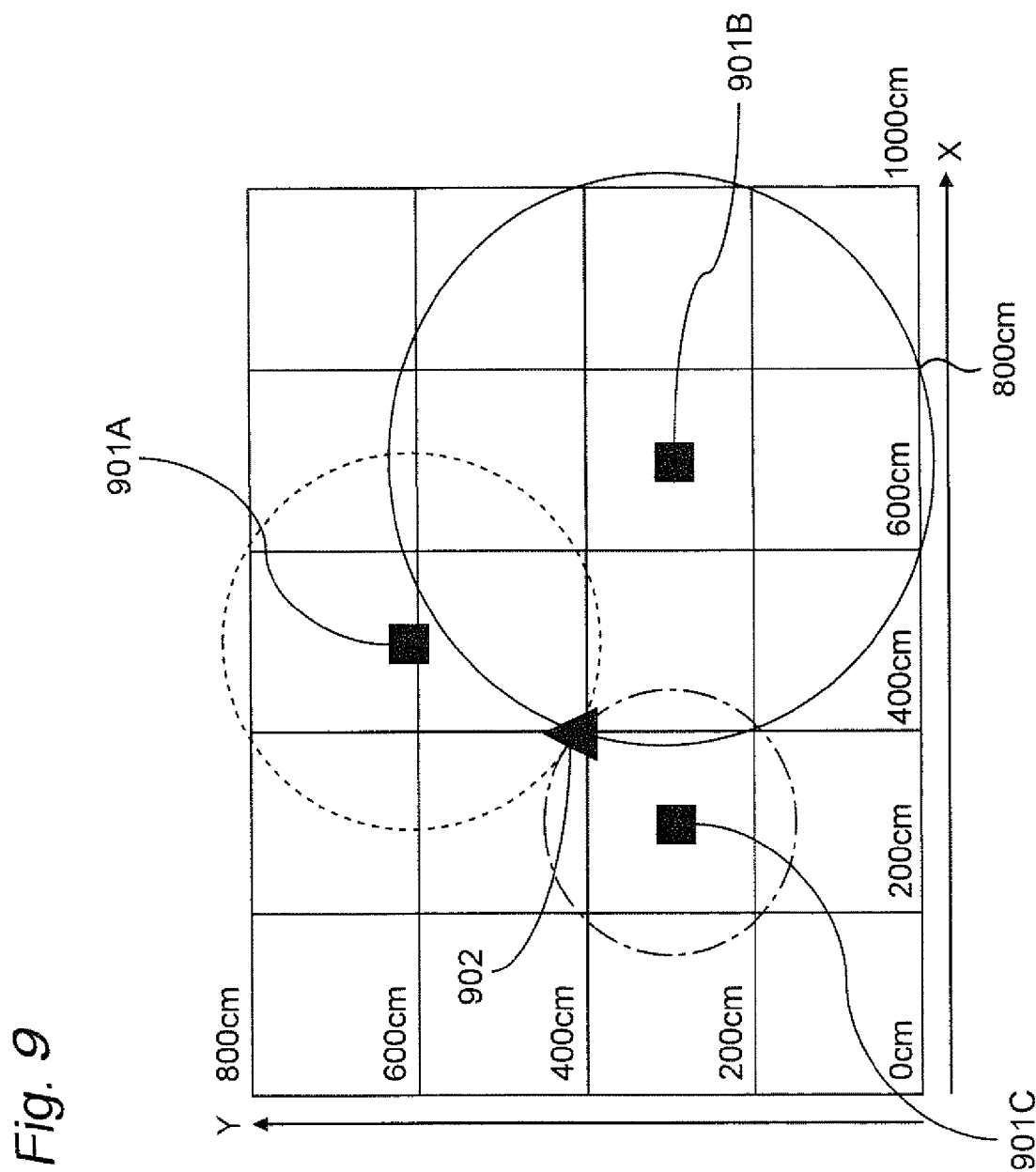
FIG. 9 is a view showing an example of a position detection method based on the tag reader in the position calibration information collecting apparatus according to the first embodiment of the present invention.

When the tag reader 203 detects the tag 902 (tag ID of the tag 902) carried by a person 204, the local coordinates of the detected person 204 can be determined based on the principle of triangulation, for example. FIG. 9 shows an example of a detecting the position of the tag 902 based on triangulation. In the environment shown in FIG. 9, a base station 901A, a base station 901B, and a base station 901C as the tag detecting unit 203a connected to the information processing unit 203b are disposed. The base station 901A is disposed at local coordinates (x, y)=(500, 600); the base station 901B is disposed at local coordinates (x, y)=(700, 300); and the base station 901C is disposed at local coordinates (x, y)=(300, 300). Here, it is based on the premise that the information processing unit 203b knows the local coordinates where the three base stations 901A, 901B, and 901C are disposed. Specifically, the information processing unit 203b includes a storage unit having stored therein the local coordinates of the three base stations 901A, 901B, and 901C. The base stations 901A, 901B, and 901C are capable of calculating the distances between themselves and the tag 902, by measuring a time period since when a radio wave is emitted from each of the base stations 901A, 901B, and 901C until when the radio wave returns from the tag 902. In such a situation, it is assumed that the tag 902 is present at local coordinates (x, y)=(400, 400). Then, the base station 901A can recognize that the tag 902 exists on an arc whose center is the position of the base station 901A and whose radius is 223.61 cm. Similarly, the base station 901B can recognize that the tag 902 exists on an arc whose center is the position of the base station 901B and whose radius is 316.23 cm. The base station 901C can recognize that the tag 902 exists on an arc whose center is the position of the base station 901C and whose radius is 141.42 cm. The information processing unit 203b can determine that the position where all the three arcs overlap one another is the position where the tag 902 is present. With reference to FIG. 9, the description has been given of the tag position detection performed in a two-dimensional space. As to a case where the tag position detection is performed in the real space (a three-dimensional space), the sole difference is a spherical surface replacing each of the arc shown in FIG. 9, and other processes remain the same. The foregoing corresponds to the process of step S801 in the flowchart of FIG. 8. That is, in step S801, when the information processing unit 203b of the tag reader 203 determines that a person 204 is detected (i.e., the tag ID is detected) using the tag reader 203, the control proceeds to the next step S802. On the other hand, when the information processing unit 203b of the tag reader 203 determines that a person 204 is not detected (i.e., the tag ID is not detected) using the tag reader 203, the process of step S801 is repeatedly performed until the information processing unit 203b of the tag reader 203 determines that a person 204 is detected. Though not specifically shown in the figure, depending on the situation, when the information processing unit 203b of the tag reader 203 determines that a person 204 is not detected, the position calibration information collecting process may end.

The feature information as to the detected person 204 (actually, the tag 902 that the person 204 carries) may be ID data (tag ID) stored in the tag 902, for example. In this manner, the process of extracting the feature information being the tag ID corresponds to the process of step S802 in the flowchart of FIG. 8. Thereafter, the control proceeds to the process of step S803.

Here, it is based on the premise that the observer device 101 includes a timer for acquiring information as to the time when the person 204 (or the tag ID of the tag 902) is detected.

Further, hereinafter, the description will continue based on the premise that the observation period of the camera 202 and the tag reader 203 is one second, as an example.

<Description of Person Detection History Database>

In the person detection history database 102, the time when the observer device 101 detects a person 204, the feature information as to the person 204 detected by the observer device 101, and the local coordinates where the person 204 is detected by the observer device 101, are each stored by the observer device 101.

FIG. 3A shows one example of the person detection history database 102 when the camera 202 detects a person 204. FIG. 3B shows one example of the person detection history database 102 when the tag reader 203 detects a person 204.

The person detection history database 102 shown in FIG. 3A can store therein the time when the camera 202 detects a person 204, the local coordinates of the person 204, and color feature information as to the person 204, and an observation ID associated therewith (information for discerning between observation information pieces each including the time, the local coordinates, and the color feature information). For example, at time 2008/09/02_12:00:01, a person whose color feature information is red is detected at local coordinates (x, y)=(50, 550), and these items are stored in association with observation ID=CAM_001 in the person detection history database 102. At time 2008/09/02_12:00:04, a person whose color feature information is white is detected at local coordinates (1050, 350), and these items are stored in association with observation ID=CAM_005 in the person detection history database 102. Here, the first-time detection position estimating means 103 can determine that the color feature information stored in association with the observation ID=CAM_001 and that stored in association with the observation ID=CAM_005 are different from each other. Based on that, the first-time detection position estimating means 103 can estimate that the person detected and associated with the observation ID=CAM_001 and the person detected and associated with the observation ID=CAM_005 are different persons.

On the other hand, the person detection history database 102 shown in FIG. 3B can store therein the time when the tag reader 203 detects a person 204, the local coordinates of the person 204, and the tag ID of the person 204, and an observation ID associated therewith (information for discerning between observation information pieces each including the time, the local coordinates and the tag ID). For example, at time 2008/09/02_12:00:01, a person whose tag ID=001 is detected at local coordinates (0, −600), and these items are stored in association with observation ID=TAG_001 in the person detection history database 102. At time 2008/09/02_12:00:04, a person whose tag ID=002 is detected at local coordinates (1000, −400), and these items are stored in association with observation ID=TAG_005 in the person detection history database 102. Here, the first-time detection position estimating means 103 can determine that the tag ID stored in association with the observation ID=TAG_001 and that stored in association with the observation ID=TAG_005 are different from each other. Based on that, the first-time detection position estimating means 103 can estimate that the person detected and associated with the observation ID=TAG_001 and the person detected and associated with the observation ID=TAG_005 are different persons.

The foregoing process of storing by the camera 202 or the tag reader 203 the feature information and the local coordinates extracted by the camera 202 or the tag reader 203 in the person detection history database 102 corresponds to the process of step S803 shown in the flowchart in FIG. 8. Thereafter, the control proceeds to the process of step S804.

<Description of First-Time Detection Position Estimating Means>

The first-time detection position estimating means 103 estimates the observation ID associated with the fact that the person 204 is detected for the first time by the observer device 101, based on the detection history information as to the person 204 stored in the person detection history database 102. Details of the estimation method will be described by way of the following description as to the first-time detection position history database 104.

<Description of First-Time Detection Position History Database>

In the first-time detection position history database 104, at least the position where the person 204 is detected for the first time is stored by the first-time detection position estimating means 103.

FIG. 4A shows one example of the first-time detection position history database 104 when the camera 202 detects the person 204 for the first time. FIG. 4B shows when the tag reader 203 detects the person 204 for the first time.

As the data in the first-time detection position history database 104 shown in FIG. 4A, the time when the camera 202 detects the person 204 for the first time, the local coordinates of the person 204, and color feature information as to the person 204, and an observation ID associated therewith can be stored by the first-time detection position estimating means 103. It is to be noted that the data in the first-time detection position history database 104 shown in FIG. 4A is created by the first-time detection position estimating means 103 based on the detection history information as to the person 204 stored in the person detection history database 102 shown in FIG. 3A.

Figure 12:
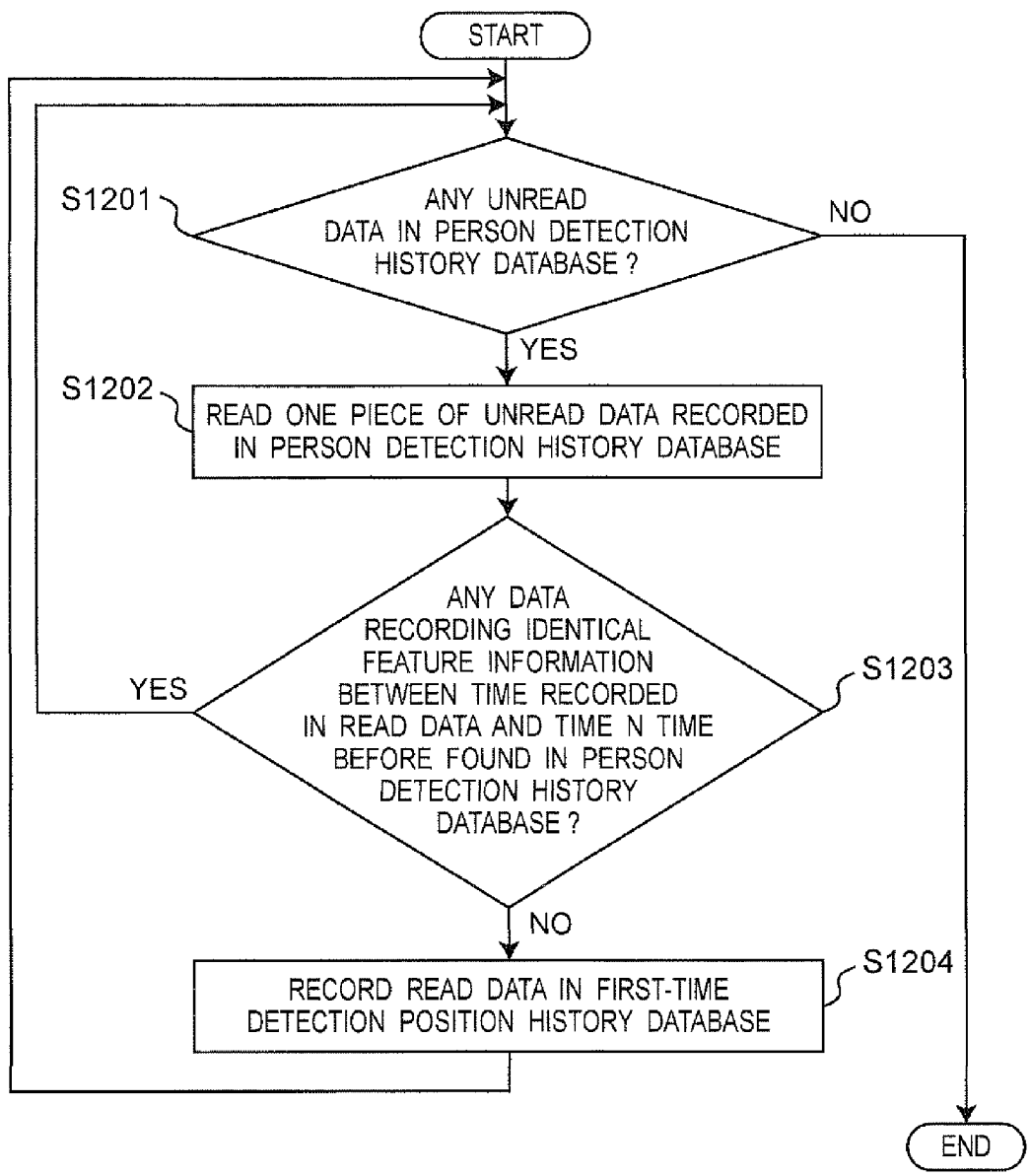
FIG. 12 is a flowchart showing a first-time detection position extracting process performed by the position calibration information collecting apparatus according to the first embodiment of the present invention.

With reference to the flowchart of FIG. 12, a description will be given of a method for acquiring the first-time detection position using the data in the first-time detection position history database 104 shown in FIG. 4A.

In step S1201, the first-time detection position estimating means 103 determines whether or not any unread data exists in the person detection history database 102. When the first-time detection position estimating means 103 determines that there is no unread data, the first-time detection position acquiring process ends. As to a method for determining whether or not any unread data exists, performed by the first-time detection position estimating means 103 will be described later.

Step S1202 is a process performed when the first-time detection position estimating means 103 determines in step S1201 that unread data exists. The first-time detection position estimating means 103 reads a piece of unread data out of the unread data stored in the person detection history database 102.

Next, in step S1203, the data read in step S1202 undergoes the following process. That is, the first-time detection position estimating means 103 determines whether or not any data storing the feature information identical to that stored in the read data is stored in the person detection history database 102, between the time stored in the read data and the time N time before. When the first-time detection position estimating means 103 determines that the data storing the identical feature information exists in the person detection history database 102, the first-time detection position estimating means 103 determines that it is not the first time to detect the person. Then, the control returns to the process of step S1201. Here, N may assume the value of the observation period (e.g., an arbitrary time period of one to two seconds, or 100 ms) of the observer device 101. In consideration of the possibility of the observer device 101 failing to detect the person 204, N may assume a constant multiple of the observation period of the observer device 101.

Step S1204 is a process that is performed when the first-time detection position estimating means 103 determines in step S1203 that the data storing the identical feature information exists between the time stored in the read data and the time N time before. By this process, the first-time detection position estimating means 103 stores the data read in step S1202 in the first-time detection position history database 104. Thereafter, the control returns to the process of step S1201.

In the following, a description will specifically be given with reference to FIGS. 3A and 4A.

In the first-time detection position history database 104 shown in FIG. 4A, an observation ID=CAM_001, an observation ID=CAM_005, and an observation ID=CAM_016 are stored by the first-time detection position estimating means 103 as the observation IDs associated with the first-time detection of the person 204. It is to be noted that, instead of using the first-time detection position history database 104, it is also possible to provide a field in the person detection history database 102 for indicating whether or not the person 204 is detected for the first time.

The observation ID=CAM_001 is stored because a person whose color feature information is red is detected for the first time. Similarly, the observation ID=CAM_005 is stored because a person whose color feature information is white is detected for the first time. The observation ID=CAM_016 is stored despite its color feature information being red. This is because no person whose color feature information is red is detected in the observation (time 2008/09/02_12:00:09) prior to the observation associated with the observation ID=CAM_016 (time 2008/09/02_12:00:10). That is, this can be construed that the person whose color feature information is red has once left the room 201 at time 2008/09/02_12:00:08, and enters the room 201 at time 2008/09/02_12:00:10. This shows that N is set to the value of one second, which is an exemplary observation period of the observer device 101, based on an assumption that the observer device 101 (the camera 202 in this case) does not fail to detect the person 204. In other words, this is because, when the person 204 having the identical color feature information is sequentially observed in sequential observations taking place every observation period, the first-time detection position estimating means 103 determines that the person 204 is in the room 201; whereas when the person 204 having the identical color feature information could not be observed in such sequential observations, the first-time detection position estimating means 103 determines that the person 204 has left the room 201.

Now, it is discussed a case where the camera 202 fails to detect the person 204 despite the person 204 being in the room 201. In this case, for example, when the camera 202 fails to detect the person 204 for M times (where M is an integer greater than 0), the first-time detection position estimating means 103 may determine that the person 204 has left the room 201. That is, in a case where the observation period of the camera 202 is one second, when the first-time detection position estimating means 103 determines that the person 204 has not been detected for (N×M) seconds, the first-time detection position estimating means 103 determines that the person 204 has left the room.

Returning back to the example of FIG. 3A, the person having the red feature has not been detected during the time following time 2008/09/02_12:00:08, until the next detection of the person having the red feature at time 2008/09/02_12:00:10, which is two seconds later. The first-time detection position estimating means 103 determines that the person 204 has left the room 201 when once the person 204 fails to be detected. In this case, in the first-time detection position history database 104, the observation ID=CAM_001, the observation ID=CAM_005, and the observation ID=CAM_016 are stored by the first-time detection position estimating means 103. However, for example when the person 204 fails to be detected sequentially five times or more (that is, M=5), the first-time detection position estimating means 10 determines that the person 204 has left the room 201. In this case, the first-time detection position history database 104 stores therein the observation ID=CAM_001 and CAM_005. In this case, this means that the first-time detection position estimating means 10 is caused to determine that the camera 202 has failed to detect the person 204 at the time 2008/09/02_12:00:09 associated with the observation ID=CAM_014.

On the other hand, in the first-time detection position history database 104 shown in FIG. 4B, the time when the tag reader 203 detects a person 204 for the first time, the local coordinates of the person 204, and the tag ID, and an observation ID associated therewith can be stored by the first-time detection position estimating means 103. It is to be noted that the first-time detection position history database 104 shown in FIG. 4B is created by the first-time detection position estimating means 103 based on the detection history information as to the person 204 stored in the person detection history database 102 shown in FIG. 3B.

Now, with reference to the flowchart of FIG. 12, a description will be given of a method for acquiring the first-time detection position using the first-time detection position history database 104 shown in FIG. 4B.

In step S1201, the first-time detection position estimating means 103 determines whether or not any unread data exists in the person detection history database 102. When the first-time detection position estimating means 103 determines that there is no unread data, the first-time detection position acquiring process ends.

As to the method for determining whether or not any unread data exists, the first-time detection position estimating means 103 may use the observation IDs. For example, the observation IDs are to be provided with observation ID numbers in ascending order in order of recording precedence in the person detection history database 102. When the first-time detection position estimating means 103 reads the data recorded in the person detection history database 102, the first-time detection position estimating means 103 stores the read observation ID in its internal memory or the like. This allows the first-time detection position estimating means 103 to determine that the data to be read is the data following the observation ID stored in the internal memory; and to determine that there is no unread data when such data does not exist.

Step S1202 is a process that is performed when the first-time detection position estimating means 103 determines in step S1201 that unread data exists. The first-time detection position estimating means 103 reads a piece of unread data stored in the person detection history database 102.

Next, in step S1203, the read data undergoes the following process. That is, the first-time detection position estimating means 103 determines whether or not any data storing the tag ID (feature information) identical to that stored in the read data is stored between the time stored in the read data and the time N time before in the person detection history database 102. When the first-time detection position estimating means 103 determines that the data storing the identical tag ID exists in the person detection history database 102, the first-time detection position estimating means 103 determines that it is not the first time to detect the person, and the control returns to the process of step S1201. Here, N may assume the value of the observation period (e.g., an arbitrary time period of one to two seconds, or 100 ms) of the observer device 101. In consideration of the possibility of the observer device 101 failing to detect the person 204, N may assume a constant multiple of the observation period of the observer device 101.

Step S1204 is a process that is performed when the first-time detection position estimating means 103 determines in step S1203 that no data storing the identical tag ID exists between the time stored in the read data and the time N time before. The first-time detection position estimating means 103 stores the data read in step S1202 as the first-time detection position information in the first-time detection position history database 104. Thereafter, the control returns to the process of step S1201.

In the following, a description will specifically be given with reference to FIGS. 3B and 4B.

In the first-time detection position history database 104 shown in FIG. 4B, an observation ID=TAG_001, an observation ID=TAG_005, and an observation ID=TAG_016 are stored by the first-time detection position estimating means 103 as the observation IDs associated with the first-time detection of the person 204.

It is to be noted that, instead of using the first-time detection position history database 104, it is also possible to provide a field in the person detection history database 102 for indicating whether or not the person 204 is detected for the first time.

The observation ID=CAM_001 is stored because the observation ID=CAM_001 is the information representing that a person whose tag ID (feature information) is "001" is detected for the first time. Similarly, the observation ID=CAM_005 is stored because the observation ID=CAM_005 is the information representing that a person whose tag ID (feature information) is "002" is detected for the first time. Similarly, the observation ID=CAM_016 is stored because the observation ID=CAM_016 is the information representing that a person whose tag ID (feature information) is "003" is detected for the first time.

It is to be noted that, the process related to the detection failure of the observer device 101 is the same as in the foregoing case of the camera 202. Accordingly, in a case where it is assumed that the observer device 101 (the tag reader 203 in this case) does not fail to detect the person 204, N may be set to the value of one second, which is an exemplary observation period of the observer device 101. In other words, this is because, when the person 204 having the identical tag ID is sequentially observed in sequential observations taking place every observation period, the first-time detection position estimating means 103 determines that the person 204 is in the room 201; whereas when the person 204 having the identical tag ID could not be observed in such sequential observations, the first-time detection position estimating means 103 determines that the person 204 has left the room 201.

Now, it is discussed a case where the tag reader 203 fails to detect the person 204 despite the person 204 being in the room 201. In this case, for example, when the tag reader 203 fails to detect the person 204 for M times (where M is an integer greater than 0), the first-time detection position estimating means 103 may determine that the person 204 has left the room 201. That is, in a case where the observation period of the tag reader 203 is one second, when the first-time detection position estimating means 103 determines that the person 204 has not been detected for (N×M) seconds, the first-time detection position estimating means 103 determines that the person 204 has left the room.

The foregoing process of extracting the information as to the first-time detection history of the person 204 (for example, local coordinates) by the first-time detection position estimating means 103 based on the detection history information as to the person 204 stored in person history database 102 corresponds to the process of step S804 in the flowchart in FIG. 8. Thereafter, the control proceeds to the process of step S805.

Next, in step S805, the first-time detection position estimating means 103 determines whether or not the information as to the history of detecting the person 204 (for example, local coordinates) is extracted (exists). Further, when the first-time detection position estimating means 103 determines that the information as to the history of detecting the person 204 (for example, local coordinates) is extracted in step S805, the process of storing, by the first-time detection position estimating means 103, the extracted information as to the history (for example, local coordinates) in the first-time detection position history database 104 corresponds to the process of step S806 in the flowchart of FIG. 8. Thereafter, the control proceeds to the process of step S807. On the other hand, when the first-time detection position estimating means 103 determines that the information as to the history of detecting the person 204 (for example, local coordinates) fails to be extracted in step S805, the entire procedure of the position calibration information collecting apparatus ends.

<Description of Environment Map Database>

The environment map database 107 previously stores therein at least the global coordinates of the door 205 being the doorway to the room 201. Here, being different from the local coordinates, the global coordinates are the absolute coordinates of the room 201. As an example, the global coordinates refer to the three-dimensional coordinates whose origin is one corner of the floor of the room 201.

Figure 14:
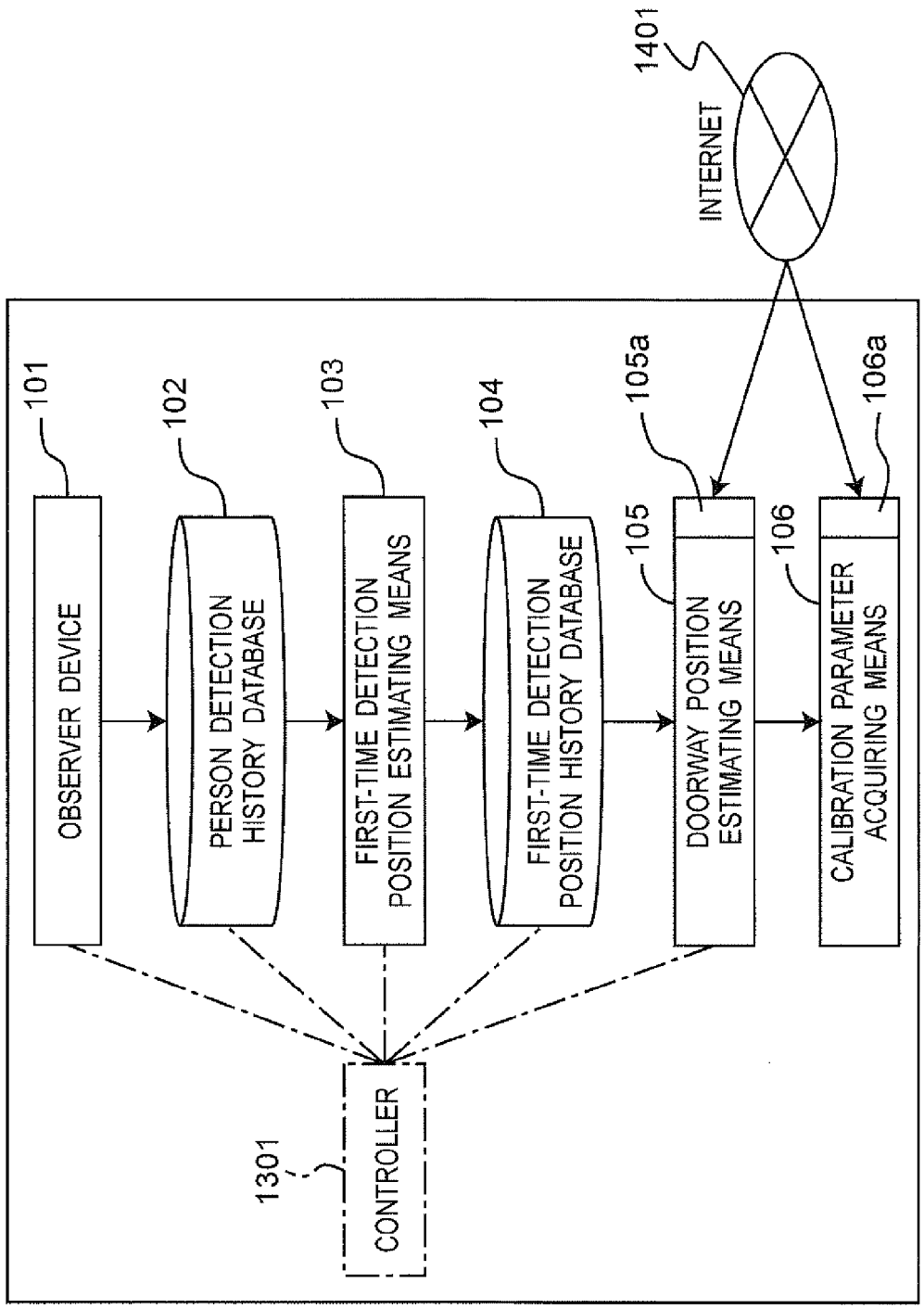
FIG. 14 is a block diagram showing the structure of a position calibration information collecting apparatus according to another variation example of the first embodiment of the present invention.

As shown in FIG. 1, the environment map database 107 may previously be stored in the position calibration information collecting apparatus. Instead of previously storing the environment map database 107, as shown in FIG. 14, the doorway position estimating means 105 and the calibration parameter acquiring means 106 may each acquire information online which is the same as the information stored in the environment map database 107 via the Internet 1401.

Figure 13:
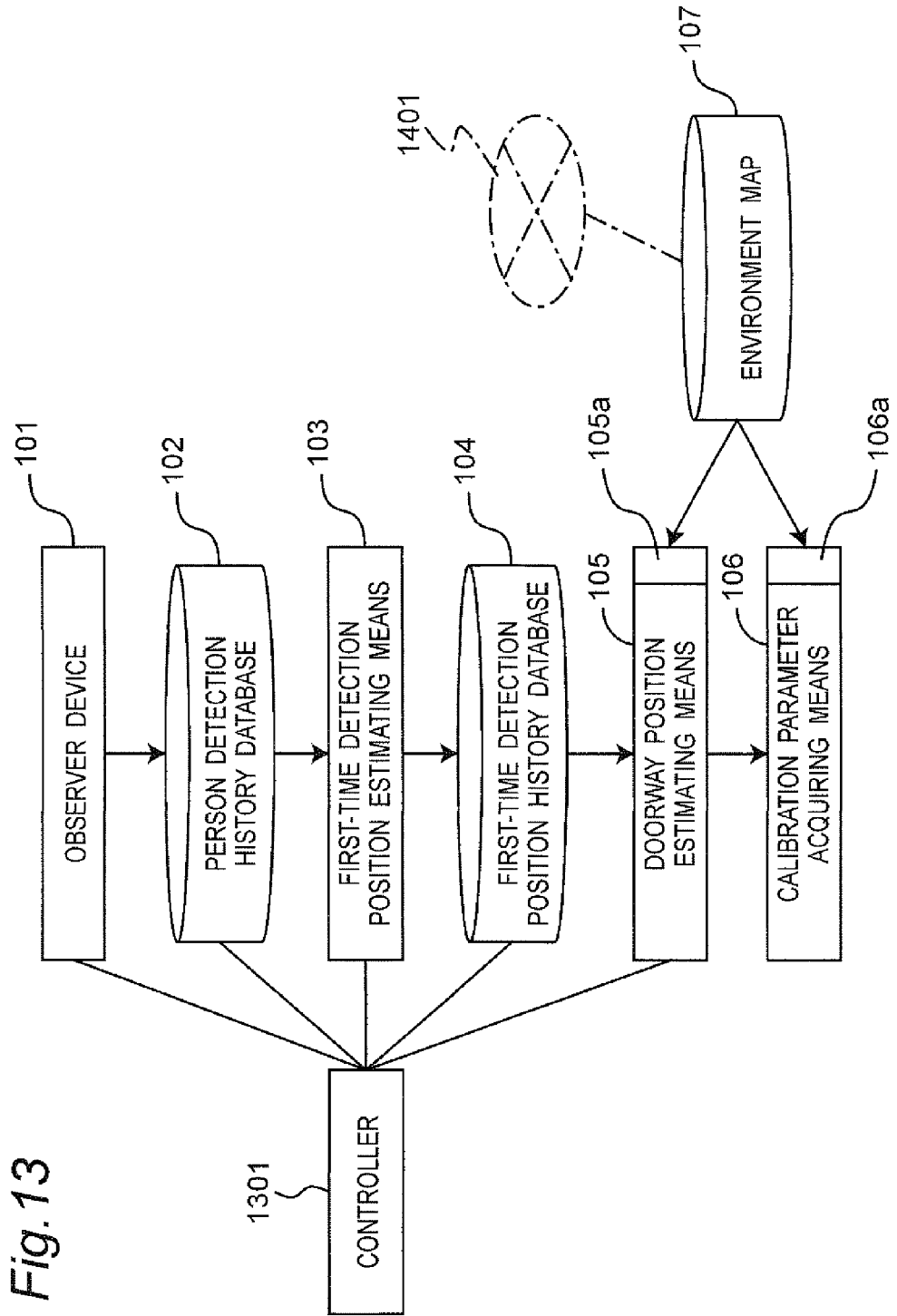
FIG. 13 is a block diagram showing the structure of a position calibration information collecting apparatus according to a variation example of the first embodiment of the present invention.

Alternatively, as shown in FIG. 13 by the dashed-dotted line, the environment map database 107 is arranged so as to be capable of connecting to the Internet 1401, such that required information can previously be acquired by using the Internet 1401 and be stored in the environment map database 107. Thereafter, when it becomes necessary to update the information (for example, in a case where it becomes necessary to acquire new information, e.g., when the observer device 101 is newly installed; when the type of the observer device 101 is changed; or when a new door is made as a result of renovation), the updated information may be acquired by use of the Internet 1401 and may then be stored in the environment map database 107.

FIG. 5 shows an example of the environment map database 107.

In the environment map database 107 shown in FIG. 5, environment IDs, global coordinates of pieces of furniture identified by corresponding environment IDs in the room 201, the attributes of pieces of the furniture identified by the environment IDs, and possible behaviors that may be exhibited by pieces of the furniture identified by the environment IDs are stored.

There are three types of attributes. The first one represents the doorway to the room 201, which is the door 205. In terms of the environment ID, it is DOOR_001, DOOR_002, and DOOR_003. The second one represents the position where the person 204 tends to stay in the room 201 (staying position) (for example, the person being capable of sitting on the furniture), which is the chair 206. In terms of the environment ID, it is CHAIR_004. The third one represents the position on which the person 204 cannot intrude in the room 201 (intrusion impossible) (for example, the person 204 being incapable of intruding on the disposition region of the furniture), which is the desk 207. In terms of the environment ID, it is DESK_005.

In the column of the behavior, as automatic door identification information, the behavior the furniture identified by corresponding environment ID may exhibit is previously stored. With reference to the environment map database 107 shown in FIG. 5, the behavior of the environment ID=DOOR_001 (door 205A) and that of the environment ID=DOOR_002 (door 205B) are previously stored as "manual open and close". This means that the person 204 must manually open and close the door 205 (205A, 205B) (that is, the person once stops in front of the door 205A or 205B and causes the open and close behavior to be exhibited manually). As to the environment ID=DOOR_003 (door 205C), "automatic open and close" is previously stored. This means that the door 205 is an automatic door, and that it is not necessary for the person 204 to manually open and close the door 205 (that is, it is not necessary for the person to once stop in front of the door 205C for causing the open and close behavior to be exhibited manually). The description will be given based on the structure of each door 205 as stated above, the present invention is applicable to a case where every door 205 is to be manually opened and closed, or to automatically open and close. In this section, as an example, it is based on the premise that the door 205 is at the doorway, and the person 204 enters and leaves the room 202 through the opening and closing of the door 205.

<Description of Doorway Position Estimating Means>

The doorway position estimating means 105 estimates the position of each door 205 (three doors 205A, 205B, and 205C) in the room 201 based on the local coordinates of the camera 202 and the local coordinates of the tag reader 203.

Figure 6A:
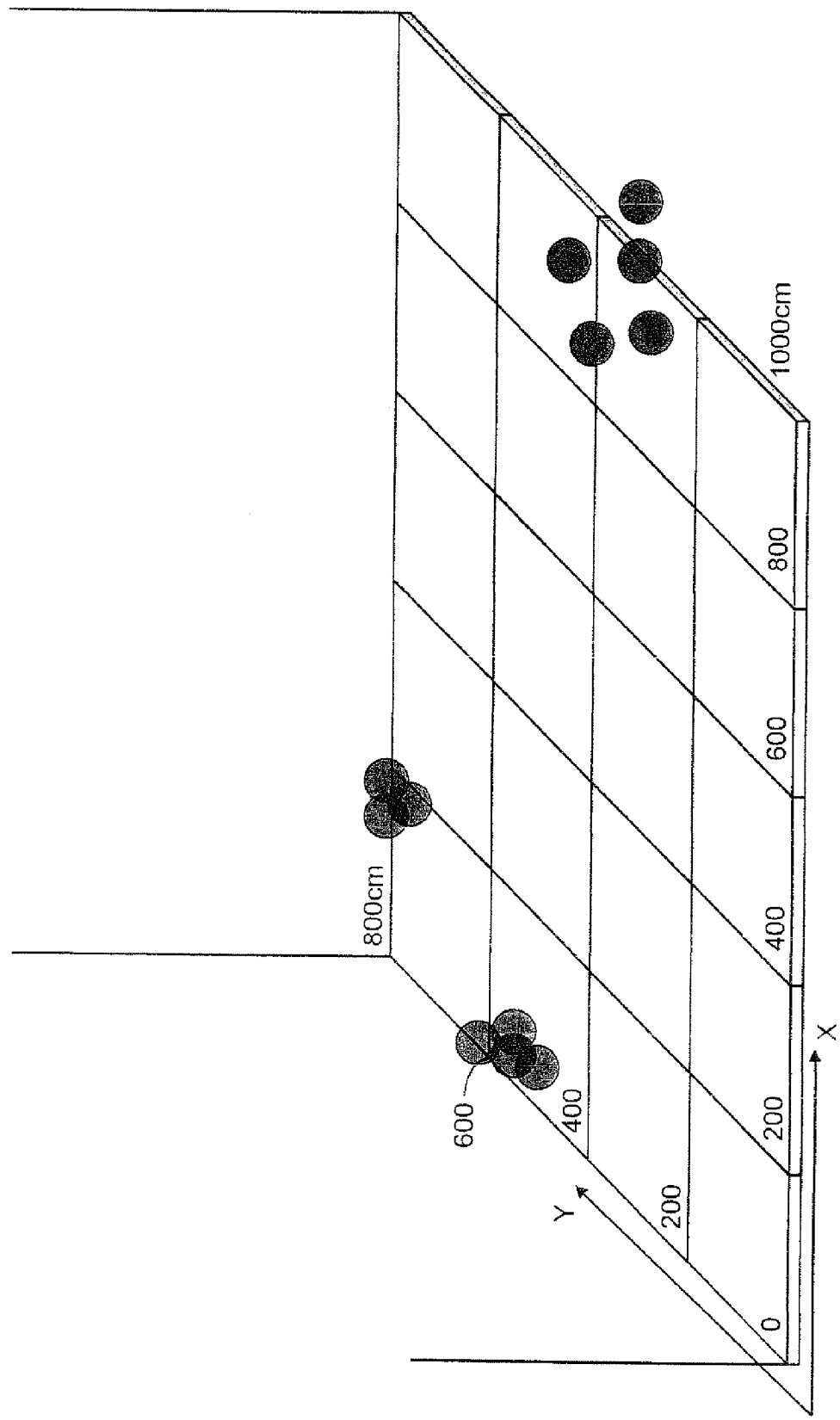
FIG. 6A is a view showing an example of person first-time detection history information obtained by the camera and stored in the first-time detection position history database of the position calibration information collecting apparatus of the first embodiment of the present invention.
Figure 6B:
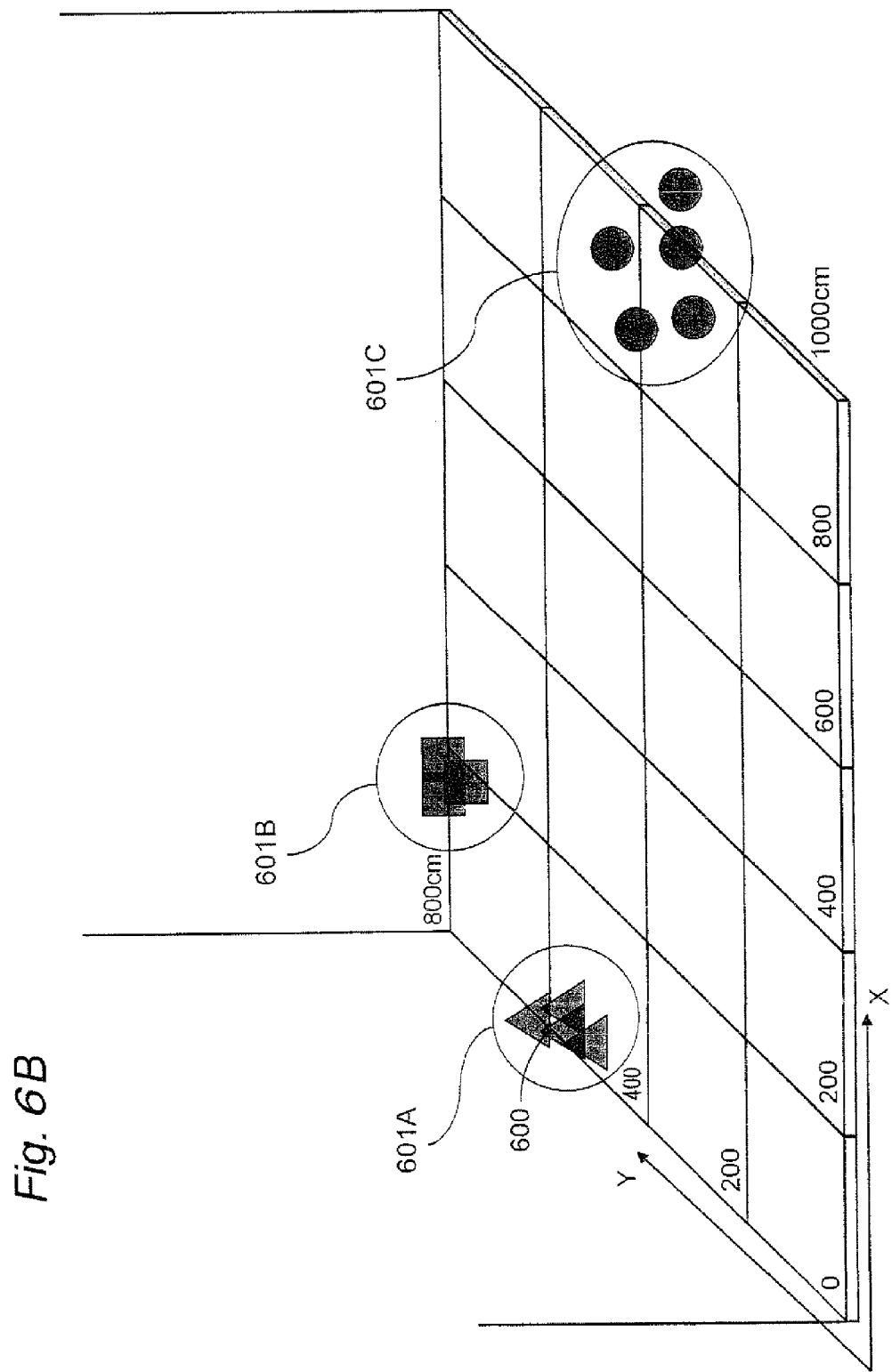
FIG. 6B is a view showing an example of person first-time detection history information having undergone a clustering process, the information having originally been obtained by the camera and stored in the first-time detection position history database of the position calibration information collecting apparatus according to the first embodiment of the present invention.

With reference to FIGS. 6A and 6B, a detailed description will be given of the doorway position estimating means 105.

FIG. 6A is an example of visualization of the first-time detection position of the person 204 detected by the camera 202 rendered by the doorway position estimating means 105. There are twelve positions which are the positions where the person 204 is detected for the first time. Here, the twelve detection positions (detection position data) may not necessary be the detection positions of an identical person. Here, the information as to the first-time detection position history shown in FIG. 6A is a visualization of the first-time detection positions stored in the first-time detection position history database 104 rendered by the doorway position estimating means 105.

FIG. 6B shows a result of clustering the twelve detection positions shown in FIG. 6A rendered by the doorway position estimating means 105. The detection positions are classified into three clusters, namely; circular (detection position data), triangular (detection position data), and square (detection position data) clusters. The cluster classified as the triangular (detection position data) cluster is referred to as the cluster 601A, the cluster classified as the square (detection position data) cluster is referred to as the cluster 601B, and the cluster classified as the circular (detection position data) cluster is referred to as the cluster 601C. Hereinafter, an arbitrary cluster out of the cluster 601A, the cluster 601B, and the cluster 601C is representatively described as the cluster 601.

As the clustering scheme, k-means clustering may be employed, for example.

In accordance with the k-means scheme, first, three representative positions out of the twelve positions are selected on a random basis. Here, the number three represents the number of the "doorway" attribute stored in the environment map database 107. It is to be noted that the data stored in the environment map database 107 is acquired by the structure information referring means 105a included in the doorway position estimating means 105.

Next, the doorway position estimating means 105 calculates the distances to the representative positions from each of the positions other than the representative positions. Then, the doorway position estimating means 105 determines that each position's closest representative position is the cluster 601 to which the position belongs (i.e., are allotted).

When the allocation of all the positions has completed, next, having the barycenter of each cluster 601 as a new representative point, the doorway position estimating means 105 calculates the distances to the representative positions from every positions.

Then, the doorway position estimating means 105 determines that each position's closest representative position is the cluster 601 to which the position belongs (i.e., are allotted).

In the following procedure, creation and allocation of the representative points are repeatedly performed. When occurrence of change ceases in the cluster 601 to which the positions belong, the process ends. Note that the clustering scheme is not limited thereto.

Here, it can be considered that the timing at which the person 204 is detected by the camera 202 and the tag reader 203 for the first time is immediately after the person 204 opens the door 205 and enters the room 201. Based thereon, the doorway position estimating means 105 can determine that the position of the door 205 in terms of local coordinates is the barycenter position of the positions obtained by performing the clustering processing of the first-time detection positions of the person 204.

The foregoing process of estimating the local coordinates of the door 205 by the doorway position estimating means 105 based on the information as to the first-time detection position history of the person 204 stored in the first-time detection position history database 104 corresponds to the process of step S807 in the flowchart in FIG. 8. Thereafter, the control proceeds to the process of step S808.

<Description of Calibration Parameter Acquiring Means>

The calibration parameter acquiring means 106 as an example of the position calibration information calculating means for calculating position calibration information acquires, based on the position in terms of local coordinates of the door 205 estimated by the doorway position estimating means 105 and the position in terms of global coordinates of the door 205 stored in the environment map database 107, parameters as an example of the position calibration information required for performing calibration as to the position of the camera 202 and the position of the tag reader 203.

As the example of the position calibration information, any of the following five types of parameters may be used as the parameters required for performing calibration as to the positions, where $$x, y \quad \text{[Formula 1]}$$

represents the position in terms of local coordinates, and $$x', y' \quad \text{[Formula 2]}$$

represents the position in terms of global coordinates:

$$sx(\text{a factor for transforming } x \text{ into } x'); \quad \text{[Formula 3]}$$

$$sy(\text{a factor for transforming } y \text{ into } y'); \quad \text{[Formula 4]}$$

$$x_0(\text{a translation amount when transforming the origin of } x \text{ into the origin of } x'); \quad \text{[Formula 5]}$$

$$y_0(\text{a translation amount when transforming the origin of } y \text{ into the origin of } y'); \text{ and} \quad \text{[Formula 6]}$$

$$\theta(\text{an angle of rotation when transforming } x \text{ coordinate axis into } x' \text{ coordinate axis}). \quad \text{[Formula 7]}$$

Equation 1 shows a coordinate transformation equation which is adapted to the factor, the translation amount, and the angle of rotation.

(Equation 1)

$$(x', y', 1) = (x, y, 1) \begin{pmatrix} sx \cdot \cos\theta & sy \cdot \sin\theta & 0 \\ -sx \cdot \sin\theta & sy \cdot \cos\theta & 0 \\ x_0 & y_0 & 1 \end{pmatrix} \quad \text{[Formula 8]}$$

Because the door 205 is at each of the three locations, there are six combinations of the positions of the doors 205 in terms of global coordinates and the positions of the doors 205 in terms of local coordinates. For all the six combinations, simultaneous equations expanded from (Equation 1) are solved, to obtain the five types of the parameters each. Here, the camera 202 and the tag reader 203 are disposed at the ceiling 201d of the room 201 so as to point right below the floor 201f. That is, the ratio between $$x \text{ and } y \quad \text{[Formula 9]}$$

can be regarded as the same as the ratio between $$sx \text{ and } sy. \quad \text{[Formula 10]}$$

Based thereon, it can be determined that the combination of the position of the door 205 in terms of global coordinates and the position of the door 205 in terms of local coordinates that approximates the following equation the best is the combination that gives the desired set of parameters:

$$x:y=sx:sy. \quad \text{[Formula 11]}$$

Now, it is discussed the method for obtaining the combination of the position of the door 205 in terms of global coordinates and the position of the door 205 in terms of local coordinates based on the environment map database 107 and the information as to the first-time detection position history after having been subjected to the clustering process.

The environment map database 107 shown in FIG. 5 contains the item "behavior" for storing the behavior of the furniture identified by corresponding environment ID. With reference to the environment map database 107, the environment ID=DOOR_001 (door 205A) and the environment ID=DOOR_002 (door 205B) indicate "manual open and close" as the information "behavior", which is information as to the automatic door identification, and hence, it can be seen that each door is a manual door; whereas the environment ID=DOOR_003 (door 205C) indicates "automatic open and close" as the information "behavior", which is the information as to the automatic door identification information, and hence, it can be seen that the door is an automatic door. In a case where the door 205 is a manual door, what occurs is the behavior that a person 204 enters the room 201 and immediately thereafter the person 204 closes the door 205. That is, it is likely that the camera 202 and the tag reader 203 detect the person 204 during the period in which the person 204 closes the door 205. On the other hand, in a case where the door 205 is an automatic door, after the person 204 enters the room 201, it is not necessary for the person 204 to close the door 205, and the person 204 keeps walking. That is, depending on the observation timing of the camera 202 and the tag reader 203, in some cases, the person 204 may be detected at the position of the door 205, and in other cases, the person 204 may be detected at the position slightly shifted from the door 205 toward the inside of the room 201. That is, variations in detection positions as a result of first-time detection with the automatic door become relatively greater than variations in detection positions as a result of first-time detection with the manual door (see five circles on the right side in FIG. 6A).

A specific method for obtaining the combination of the position of the door 205 in terms of global coordinates and the position of the door 205 in terms of local coordinates should be performed as follows: obtain the standard deviation as to the position of each cluster 601 by the doorway position estimating means 105; and determine, by the doorway position estimating means 105, that the cluster 601 having the greatest standard deviation is the detection position where the first-time detection takes place with the automatic door.

By the foregoing procedure, the doorway position estimating means 105 can determine that the cluster 601C is the cluster at the detection position where the first-time detection takes place at the door 205C which is an automatic door. Provided that the local coordinates are not inverted, the doorway position estimating means 105 can determine that the cluster 601A is the cluster at the detection position where the first-time detection takes place at the door 205A and the doorway position estimating means 105 can determine that the cluster 601B is the cluster at the detection position where the first-time detection takes place at the door 205B, based on the positional relationship between the door 205A and the door 205B stored in the environment map database 107, and the positional relationship between the cluster 601A and the cluster 601B.

Figure 6C:
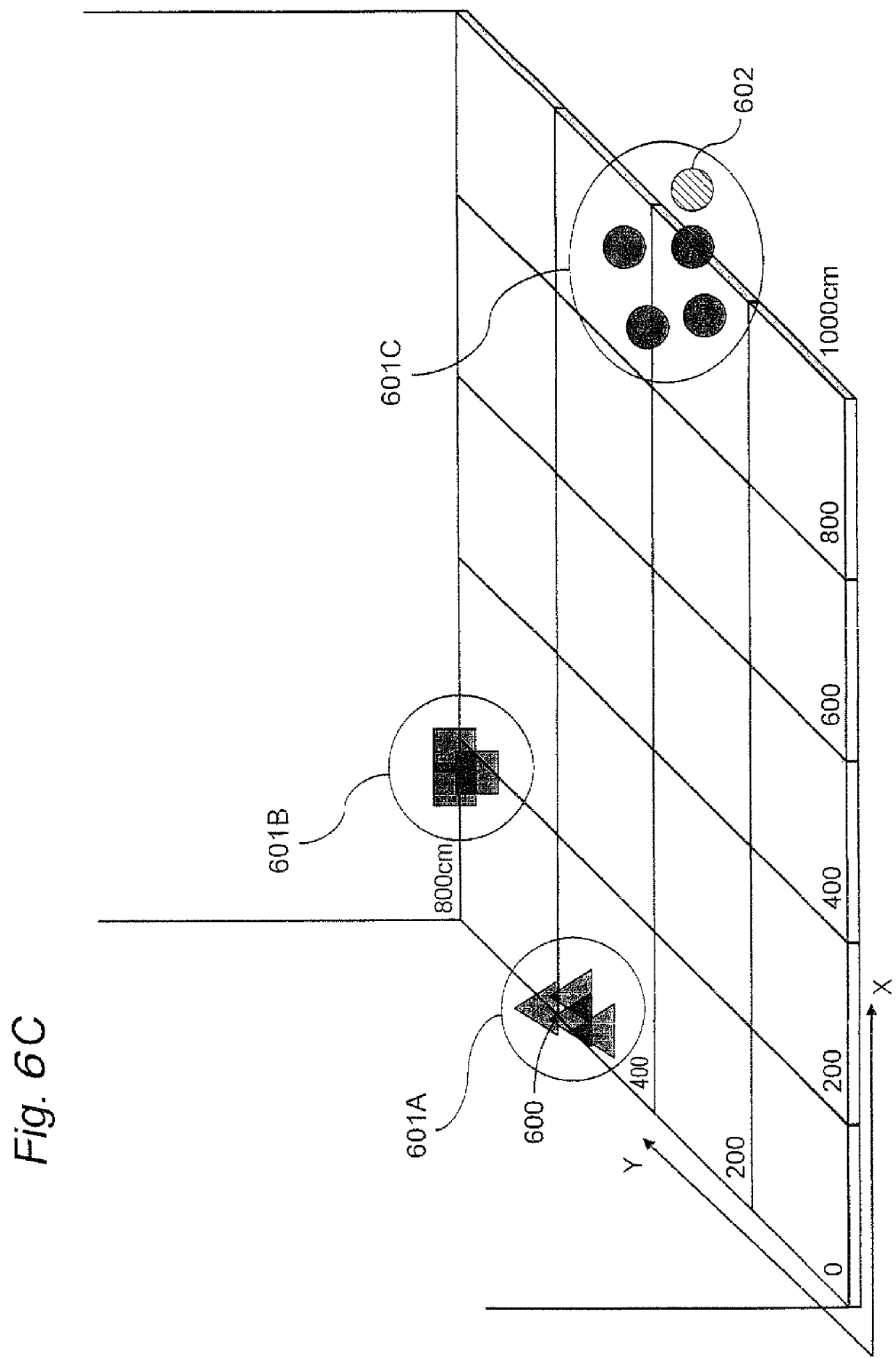
FIG. 6C is a view showing an estimation example estimated by a doorway position estimating means of the position calibration information collecting apparatus according to the first embodiment of the present invention.

Meanwhile, it has been described that the doorway position estimating means 105 regards the barycenter position of the cluster 601 as the door position. However, as has been described in the foregoing, in a case where the door 205 is an automatic door, the position at which the person 204 is detected for the first time varies. Accordingly, in such a case where the door 205 is an automatic door, the doorway position estimating means 105 may determine that the detection position detected endmost is the door position 602, out of the detection positions belonging to the cluster 601C (see FIG. 6C). As used herein, the term "endmost" refers to the position for detecting the position of each doorway arranged continuously from the walls 201a, 201b, and 201c of the room 201, located at the farthest coordinates from the central coordinates of the room 201. However, before calibration is performed, the central coordinates of the room 201 in terms of local coordinates are unknown.

Accordingly, how to obtain the "endmost" detection position by the doorway position estimating means 105 based on the person detection history will be described.

First, the doorway position estimating means 105 obtains the barycenter position out of all the positions of the person 204 stored in the person detection history database 102. The doorway position estimating means 105 determines that the detection position located at the farthest position from the barycenter position out of the detection positions belonging to each cluster is the endmost detection position among the detection positions belonging to the cluster.

It is to be noted that the data stored in the environment map database 107 is acquired by the structure information referring means 106a included in the calibration parameter acquiring means 106.

The foregoing process of obtaining by the calibration parameter acquiring means 106 the parameters required for performing calibration based on the position of the door 205 in terms of local coordinates and the position of the door 205 in terms of global coordinates stored in the environment map database 107 corresponds to the process of step S808 in the flowchart in FIG. 8. Thereafter, the entire procedure of the position calibration information collecting apparatus ends.

Here, it is also possible that: the observer device 101 observes the environment on a steady basis; the first-time detection position estimating means 103 checks a new person detection history of the person detection history database on a steady basis; and the doorway position estimating means 105 checks a new first-time detection position history of the first-time detection position history database on a steady basis. Further, it is also possible to include a controller 1301 that is connected to the observer device 101, the person detection history database 102, the first-time detection position estimating means 103, the first-time detection position history database 104, the doorway position estimating means 105, and the calibration parameter acquiring means 106, so as to control the entire position calibration information collecting process. Such an exemplary structure additionally including the controller 1301 is shown in FIGS. 13 and 14.

The controller 1301 controls the observer device 101 to have the observer device 101 observe the environment. Next, when the controller 1301 recognizes the existence of new person detection history information in the person detection history database 102, the controller 1301 controls the first-time detection position estimating means 103 to have the first-time detection position estimating means 103 estimate the first-time detection position. Then, when the controller 1301 recognizes the existence of new first-time detection position history information in the first-time detection position history database 104, the controller 1301 controls the doorway position estimating means 105 to have the doorway position estimating means 105 estimate the doorway position in the local coordinate system. It is to be noted that the timing at which the controller 1301 controls the observer device 101 may be determined by an input from the user. Further, the number of new person detection history information pieces recorded in the person detection history database 102 required for the controller 1301 to start controlling the first-time detection position estimating means 103 may previously be determined by an input from the user. Similarly, the number of new first-time detection position history information pieces stored in the first-time detection position history database 104 required for the controller 1301 to start controlling the doorway position estimating means 105 may previously be determined by an input from the user.

<How to Use Person Staying Position and Intrusion Impossible Position>

Provided that there is only one door 205 in the room 201, the simultaneous equations cannot be established and the calibration parameter acquiring means 106 cannot obtain the parameters. In such a case, the doorway position estimating means 105 can obtain information as to the position where the person 204 is likely to stay (person staying position) or as to the position on which the person 204 cannot intrude, so that the calibration parameter acquiring means 106 can use the information.

Referring to the flowchart of FIG. 11, how to use the information as to the position will be described.

A description will be given of the staying position of the person 204 (person staying position) in step S1101.

In order to acquire the calibration information required for performing calibration as to the position of the camera 202 and the position of the tag reader 203 using the information as to the person staying position, the global coordinates and local coordinates of the person staying position become necessary.

The person staying position in terms of global coordinates may previously be stored in the environment map database 107. In the environment map database 107 shown in FIG. 5, the environment ID=CHAIR_004 is stored as the position where the person 204 stays. This means that a position where the person 204 is likely to stay is previously determined among the pieces of furniture in the room 201, and such a position is stored in the environment map database 107 as the position where the person 204 stays.

The person staying position in terms of local coordinates can be estimated by the doorway position estimating means 105 based on the detection history information as to the person 204 stored in the person detection history database 102. This is explained with reference to FIG. 3A. Focusing on the person whose color feature information is white, it can be seen that the person travels on local coordinates from when detected for the first time at time 2008/09/02_12:00:04 associated with the observation ID=CAM_005, until at time 2008/09/02_12:00:07 associated with the observation ID=CAM_011. However, after time 2008/09/02_12:00:07 associated with the observation ID=CAM_011, the doorway position estimating means 105 can recognize that the person whose color feature information is white does not travel from the local coordinates (750, 350) but stops (stays) there. In such a case, the doorway position estimating means 105 may recognize the coordinates (750, 350) as the person staying position in terms of local coordinates. Alternatively, the doorway position estimating means 105 may determine whether or not the person 204 is staying in accordance with the following manner: for example, when the camera 202 detects the person 204 at the same position for N times, the doorway position estimating means 105 may determine that the person 204 is staying. That is, in a case where the observation period of the camera 202 is one second, the doorway position estimating means 105 determines that the person 204 is staying when the person 204 is detected at the same position for N seconds (=N times×1 second). It is to be noted that the camera 202 or the tag reader 203 may possibly detect the person 204 at slightly different position every time, due to observation noises. Accordingly, as to a position detected within ±α (cm) from the previous detection position, the doorway position estimating means 105 may determine that they are the identical position. The value α may be the standard deviation as to the position error of the camera 202 or the tag reader 203, for example.

Figure 11:
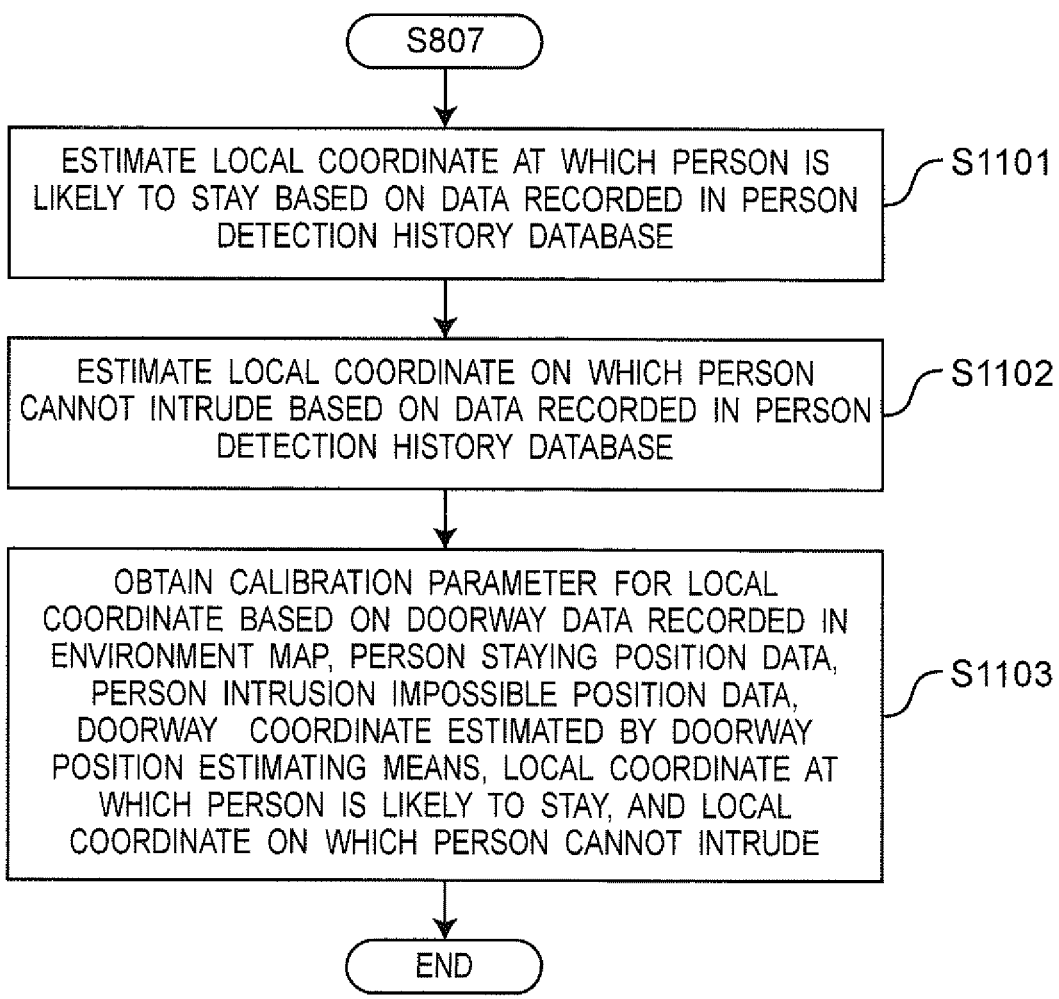
FIG. 11 is a flowchart showing a calibration parameter acquiring process which uses a person staying position and an intrusion impossible position and which is performed by the position calibration information collecting apparatus according to the first embodiment of the present invention.

The foregoing corresponds to the process performed by the doorway position estimating means 105 in step S1101 in FIG. 11. Thereafter, the control proceeds to the process of step S1102.

Next, a description will be given of the intrusion impossible position for the person 204 in the process of step S1102 performed by the doorway position estimating means 105.

In order to acquire the calibration information required for performing calibration as to the position of the camera 202 and the position of the tag reader 203 using the information as to the person intrusion impossible position, the global coordinates and local coordinates of the person intrusion impossible positions become necessary.

The person intrusion impossible positions in terms of global coordinates may previously be stored in the environment map database 107. In the environment map database 107 shown in FIG. 5, the environment ID=DESK_005 is stored as the position on which the person 204 cannot intrude. This means that a position on which the person 204 cannot intrude is previously determined among the pieces of the furniture in the room 201, and such a position is stored in the environment map database 107 as the position on which the person 204 cannot intrude.

Figure 7A:
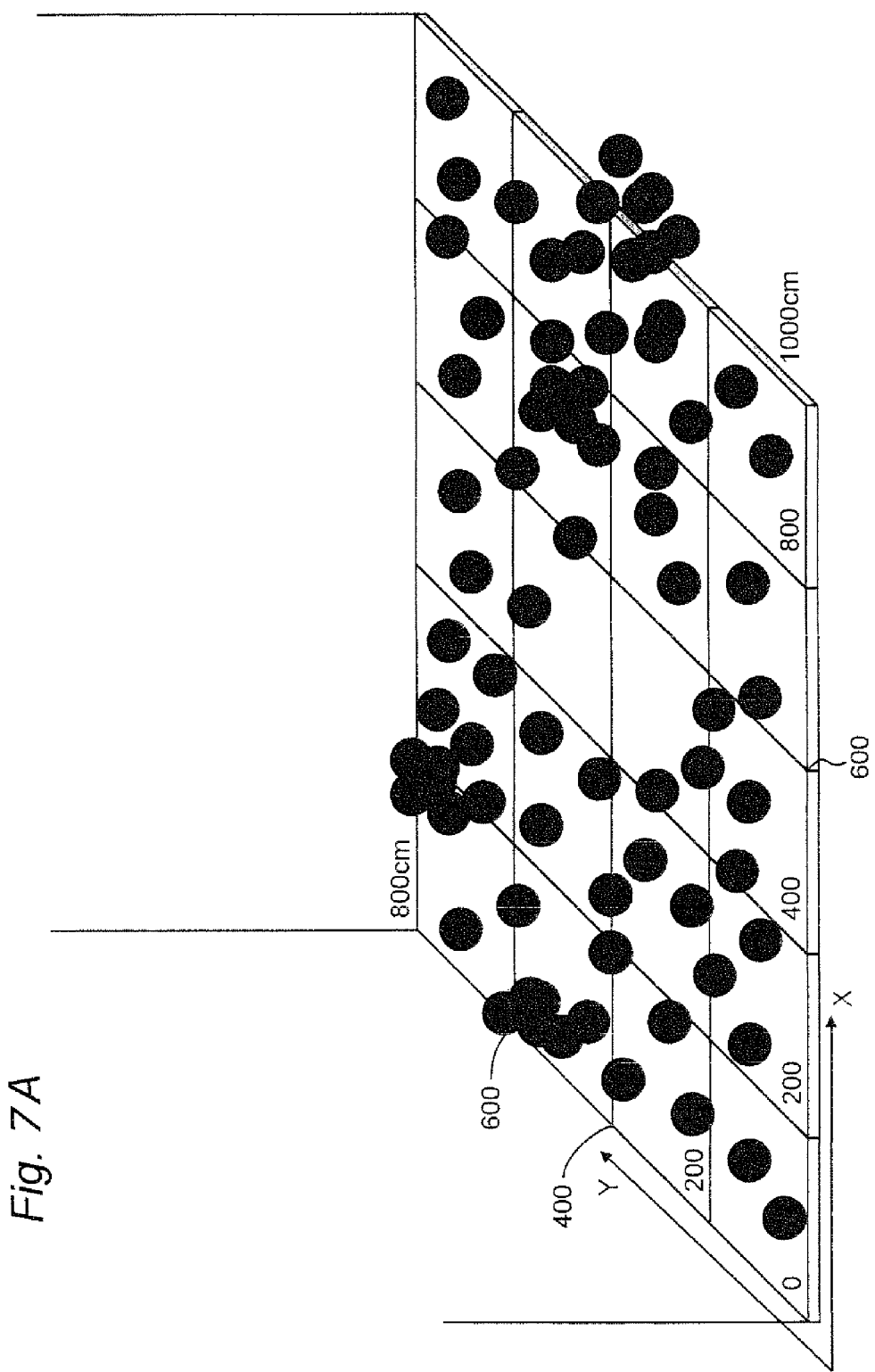
FIG. 7A is a view showing an example of person detection history information obtained by the camera and stored in the person detection history database of the position calibration information collecting apparatus according to the first embodiment of the present invention.
Figure 7B:
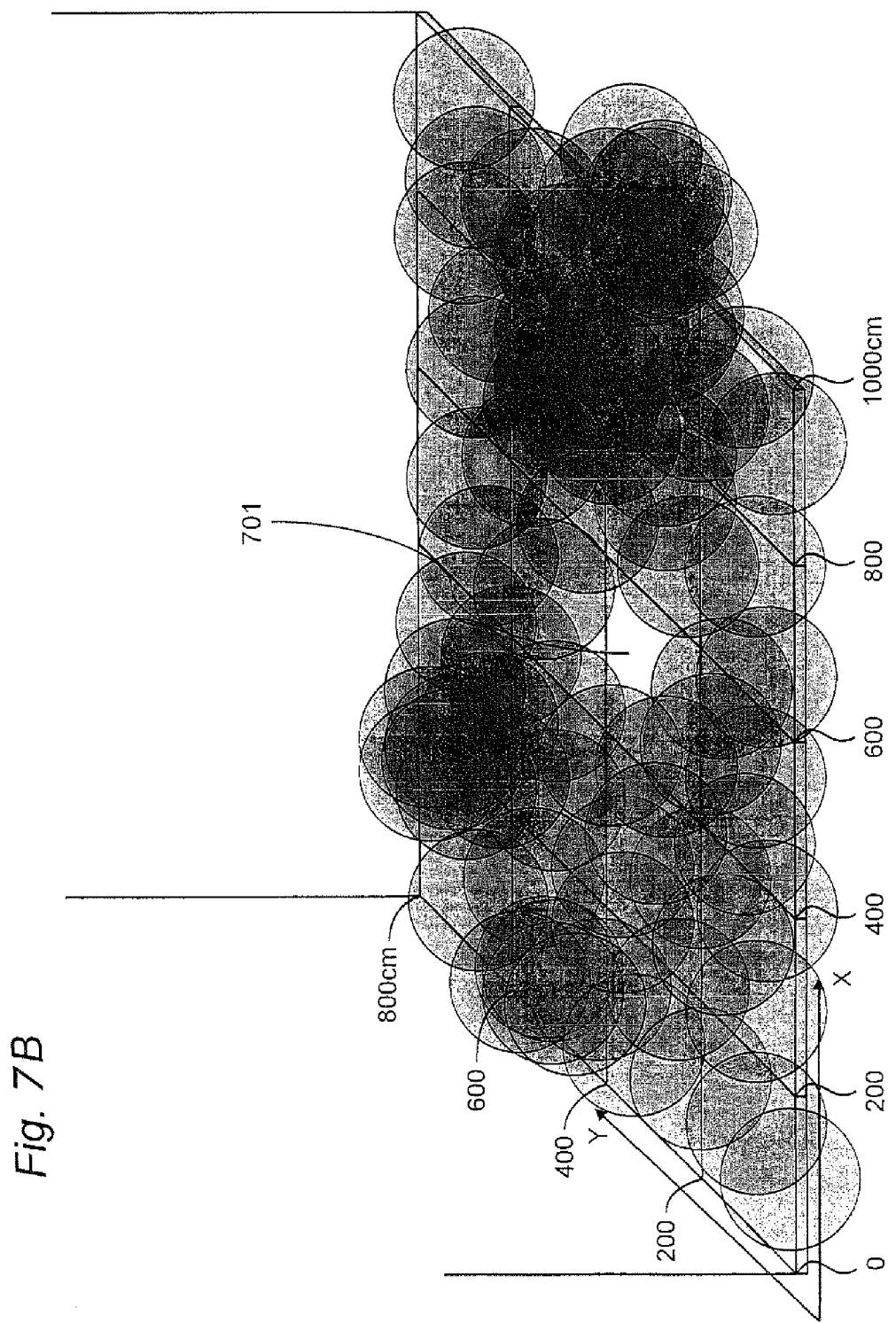
FIG. 7B is a view showing an example of the person detected position having undergone an enlarging process, the information having originally been obtained by the camera and stored in the person detection history database of the position calibration information collecting apparatus according to the first embodiment of the present invention.

With reference to FIGS. 7A and 7B, a description will be given of the person intrusion impossible position in terms of local coordinates.

FIG. 7A is an example of the information as to the history of the detection positions obtained by the camera 202 detecting the person 204. Each of the detection positions of the person 204 in FIG. 7A is stored as a point without a range. However, the actual person 204 has a certain width (such as a shoulder width). Therefore, the doorway position estimating means 105 subjects each of the detection positions of the person 204 in FIG. 7A to a process to be enlarged in X and Y directions by A cm each, such that each of them appears as a black circle sign. The value A may be adapted to the shoulder width of the actual person 204, or may be determined in consideration of the magnitude of the sensor noises of the observer device 101.

FIG. 7B is a view showing the detection positions of the person 204 in FIG. 7A being further enlarged in X and Y directions by 1 m each. From FIG. 7B, it can be seen that a region where the person 204 is not detected, i.e., a yet-to-be-entered region 701 is obtained about the center of the floor 201f of the room 201. The barycenter position of the yet-to-be-entered region 701 may be handled by the doorway position estimating means 105 as the person intrusion impossible position in terms of local coordinates. Note that, in a case where the number of the detection history information pieces of the person 204 is small, a plurality of yet-to-be-entered regions 701 will be obtained, and/or a wide yet-to-be-entered region 701 is obtained, and hence the person intrusion impossible position in terms of local coordinates cannot precisely be obtained by the doorway position estimating means 105.

The foregoing corresponds to the process performed by the doorway position estimating means 105 in step S1102. Thereafter, the control proceeds to the process of S1103.

It is to be noted that calculation of the person staying position and the intrusion impossible position is carried out by the doorway position estimating means 105.

In response to the results of step S1101 and step S1102, in step S1103, the calibration parameter acquiring means 106 acquires the calibration parameters of the camera 202 and/or the tag reader 203 based on (Equation 1).

In a case where the door 205 is at each of three locations, there are six combinations of the door positions in terms of local coordinates and the door positions in terms of global coordinates. Therefore, it is necessary for the calibration parameter acquiring means 106 to calculate the calibration parameters for each of the six combinations.

However, in a case where the position of the door 205, the staying position, and the intrusion impossible position each exist at only one location, there is only one combination of the position of the door 205, the staying position, and the intrusion impossible position in terms of local coordinates and those in terms of global coordinates. Hence, the calibration parameter as the calibration information to be obtained is solely one set, whereby the calculation time period spent by the calibration parameter acquiring means 106 becomes as one-sixth as short as the time period spent to obtain the six combinations.

The foregoing corresponds to the process performed by the calibration parameter acquiring means 106 in step S1103.

This concludes the description of the structure and operation of the position calibration information collecting apparatus 110.

<Description of Structure of Position Calibrating Apparatus>

In the following, a description will be given of a position calibrating apparatus 111 according to the first embodiment of the present invention that includes the position calibration information collecting apparatus 110, and that further includes a calibrating means (calibrating unit) 108. Because the structure and operation of the position calibration information collecting apparatus 110 is the same as those of the position calibration information collecting apparatus 110, the description will solely be given of the calibrating means 108 below.

<Description of Calibrating Means>

The position calibrating apparatus 111 further includes, in addition to the position calibration information collecting apparatus 110, the calibrating means 108 for performing calibration of the camera 202 and/or the tag reader 203 using the calibration parameter acquired by the calibration parameter acquiring means 106. In a case where the calibration parameter is +5 cm on X coordinates, the actual position of the camera 202 and/or the tag reader 203 may be shifted by 5 cm in +X-axis direction. Alternatively, the data acquired by the camera 202 and/or the tag reader 203 may be shifted by 5 cm in +X-axis direction.

Figure 10:
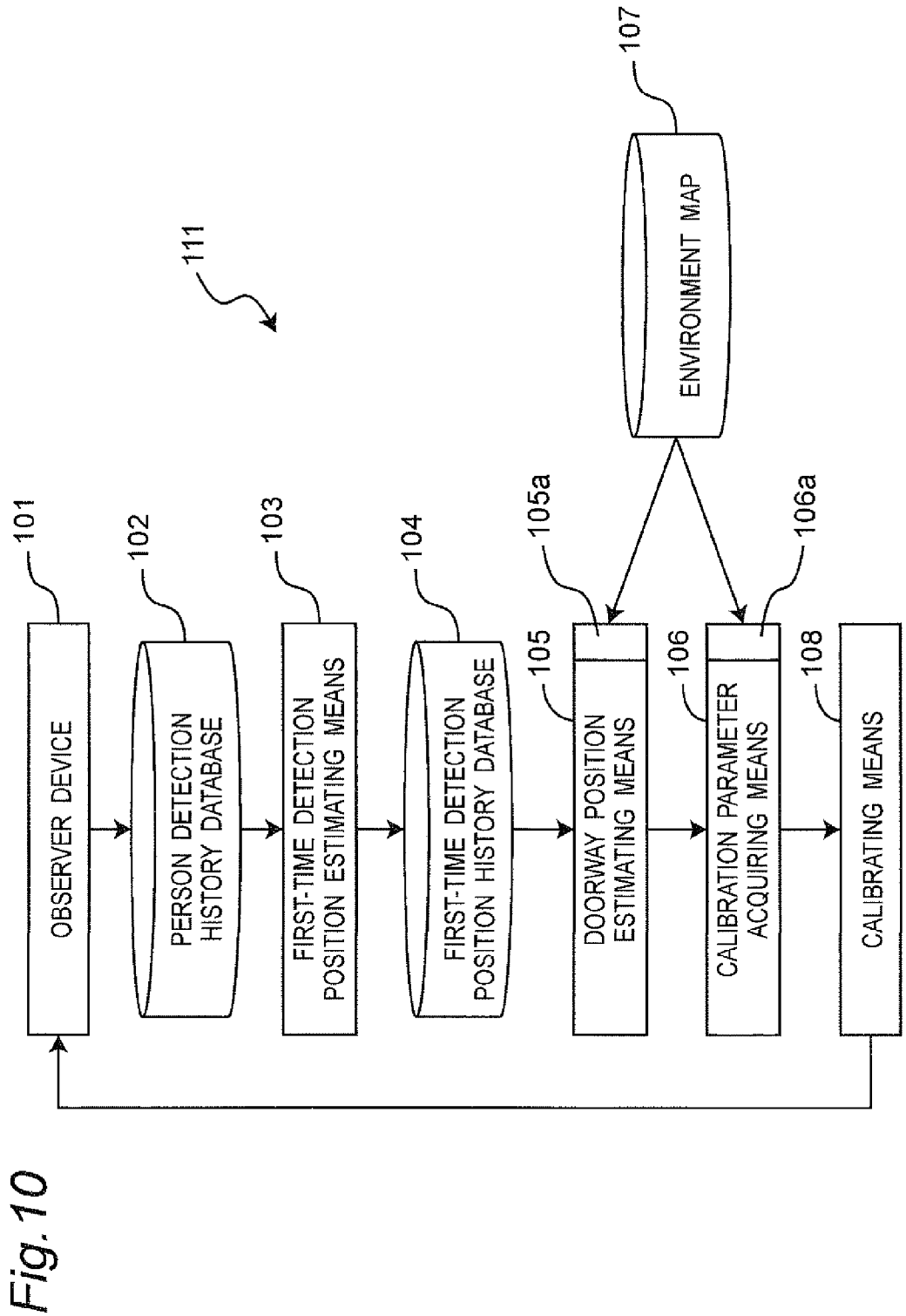
FIG. 10 is a block diagram showing the structure of the position calibration information collecting apparatus according to the first embodiment of the present invention.

FIG. 10 shows the structure of the position calibration information collecting apparatus including the calibrating means 108.

With such a structure, the position where the person 204 is detected for the first time can be estimated as the position of the door 205 as the doorway to the room 201 which is a closed environment. Thus, without the necessity of using any marker or the like previously prepared in the environment, the information required for performing calibration as to the position of the observer device 101 can be collected automatically. Further, calibration of the position of the observer device 101 can be performed by the calibrating means 108 based on the collected calibration information.

Second Embodiment

Description of Structure of Position Calibration Information Collecting Device

Figure 15:
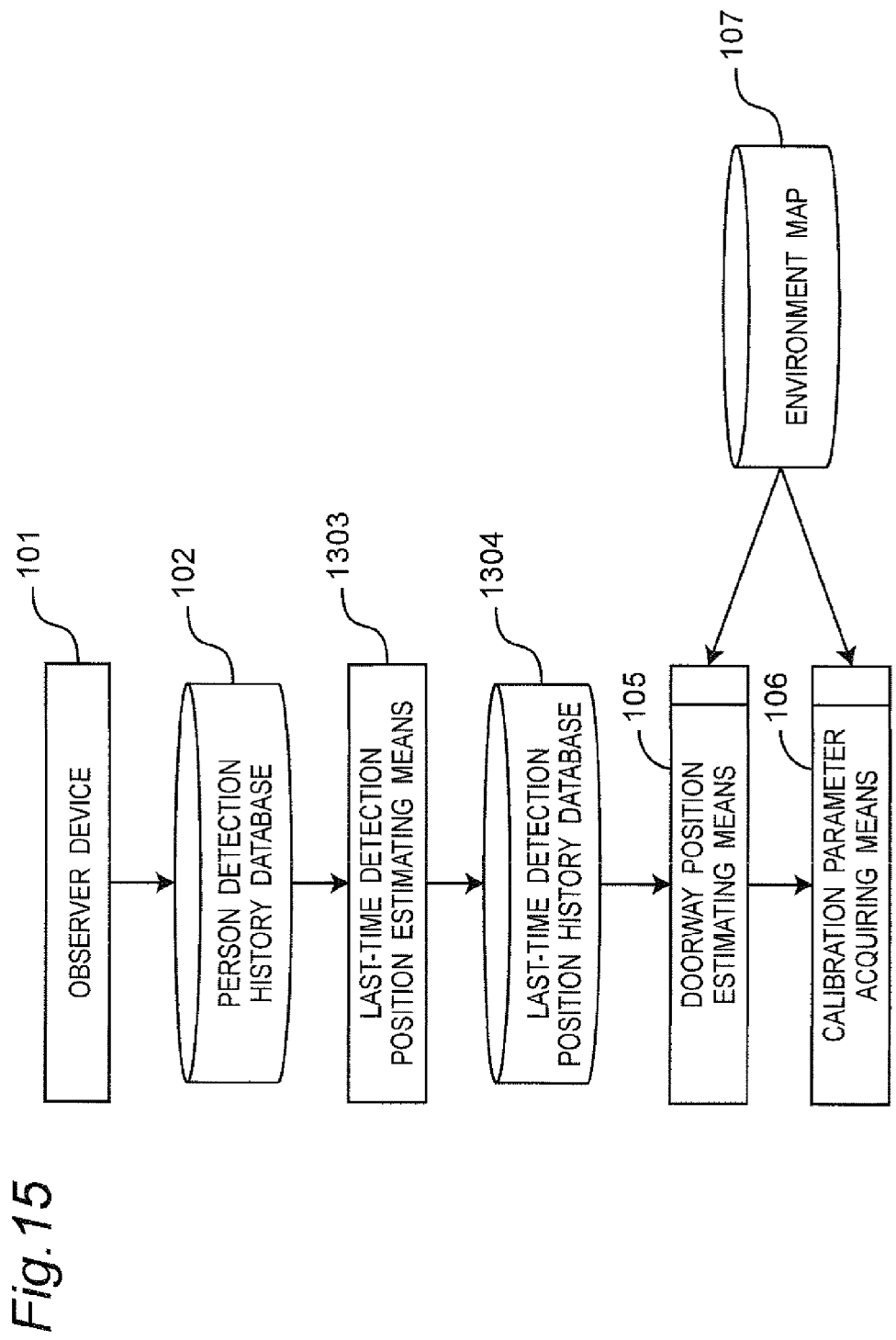
FIG. 15 is a block diagram showing the structure of a position calibration information collecting apparatus according to a second embodiment of the present invention.

FIG. 15 is a view showing the structure of a position calibration information collecting apparatus according to a second embodiment of the present invention.

The position calibration information collecting apparatus according to the second embodiment of the present invention includes an observer device 101, a person detection history database 102 as an example of a person detection history storing means, a last-time detection position estimating means (last-time detection position estimating unit) 1303, a last-time detection position history database 1304 as an example of a last-time detection position history storing means, a doorway position estimating means (doorway position estimating unit) 105, calibration parameter acquiring means (calibration parameter acquiring unit) 106 as an example of a position calibration information calculating means for calculating position calibration information, and an environment map database 107 as an example of an environment map storing means.

It is to be noted that all the means and databases other than the last-time detection position estimating means 1303 and the last-time detection position history database 1304 are identical to those in the first embodiment whose description has been given above. Further, in a process performed by the doorway position estimating means 105 according to the second embodiment, last-time detection positions are used instead of the first-time detection positions.

<Description of Last-Time Detection Position Estimating Means>

The last-time detection position estimating means 1303 estimates the observation ID associated with the fact that the person 204 is detected for the last time by the observer device 101, based on the detection history information as to the person 204 stored in the person detection history database 102. Details of the estimation method will be described by way of the following description as to the last-time detection position history database 1304, <Description of Last-Time Detection Position History Database>

In the last-time detection position history database 1304, at least the position where the person 204 is detected for the last time is stored by the last-time detection position estimating means 1303.

FIGS. 16A and 16B respectively show examples of the last-time detection position history database 1304 when the camera 202 detects the person 204 for the last time and when the tag reader 203 detects the person 204 for the last time.

In the last-time detection position history database 1304 shown in FIG. 16A, the time when the camera 202 detects the person 204 for the last time, the local coordinates of the person 204, and color feature information as to the person 204, and an observation ID associated therewith can be stored by the last-time detection position estimating means 1303. It is to be noted that the last-time detection position history database 1304 shown in FIG. 16A is created by the last-time detection position estimating means 1303 based on the detection history information as to the person 204 stored in the person detection history database 102 shown in FIG. 3A.

With reference to the flowchart of FIG. 17, a description will be given of a method for acquiring the last-time detection position using the last-time detection position history database 1304 shown in FIG. 16A.

In step S1501, the last-time detection position estimating means 1303 determines whether or not any unread data exists in the person detection history database 102, N time before the current time (i.e., the time point at which the last-time detection position is acquired). When the last-time detection position estimating means 1303 determines that no unread data exists, the last-time detection position acquiring process ends. Here, N may assume the value of the observation period (e.g., an arbitrary time period of one to two seconds, or 100 ms) of the observer device 101. In consideration of the possibility of the observer device 101 failing to detect the person 204, N may assume a constant multiple of the observation period of the observer device 101.

Here, the last-time detection position estimating means 1303 is based on the premise that the last-time detection position estimating means 1303 includes a timer.

Step S1502 is a process performed when the last-time detection position estimating means 1303 determines in step S1501 that unread data exists. The last-time detection position estimating means 1303 reads a piece of unread data out of the unread data stored in the person detection history database 102.

Next, in step S1503, the last-time detection position estimating means 1303 determines whether or not any data storing the tag ID (feature information) identical to that of the data read in step S1502, between the time stored in the read data and the N time after is stored in the person detection history database 102. When the last-time detection position estimating means 103 determines that the data storing the identical tag ID is stored in the person detection history database 102, the last-time detection position estimating means 1303 determines that the person is not detected for the last time. Then, the control returns to the process of step S1501.

Step S1504 is a process that is performed when the last-time detection position estimating means 1303 determines in step S1503 that no data storing the identical tag ID exists between the time stored in the read data and the time N time after. The last-time detection position estimating means 1303 stores the data read in step S1502 as the last-time detection position information in the last-time detection position history database 1304. Thereafter, the control returns to the process of step S1501.

When the last-time detection position is obtained in this manner, the doorway position estimating means 105 estimates the doorway position. The first-time detection position is used in the first embodiment, whereas the last-time detection position is used in the second embodiment instead of the first-time detection position. Because there is no difference between the embodiments in the processes other than the replacement of the first-time detection position by the last-time detection position, the description is not again repeated in this section.

With the structure of the second embodiment described above, the position where the person 204 is detected for the last time can be estimated as the position of the door 205 as the doorway to the room 201 which is a closed environment. Thus, without the necessity of using any marker or the like previously prepared in the environment, the information required for performing calibration as to the position of the observer device 101 can be collected automatically. Further, calibration of the position of the observer device 101 can be performed by the calibrating means 108 based on the collected calibration information.

By properly combining arbitrary embodiments or variation examples of the aforementioned various embodiments or variation examples, the effects owned by each of them can be made effectual. For example, both the first-time detection position and the last-time detection position may be used as the detection position used by the doorway position estimating means 105.

INDUSTRIAL APPLICABILITY

The position calibration information collecting apparatus, the position calibration information collecting method, and the position calibration information collecting program of the present invention make it possible to perform calibration as to the position of an observer device without the necessity of using any marker for position calibration. Accordingly, the present invention is particularly useful for a position calibration information collecting apparatus including an observer device employed as a security system for offices, factories, or homes, and a position calibration information collecting method and a position calibration information collecting program that use the observer device.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. A position calibration information collecting apparatus, comprising:
   an observer device that acquires feature information as to a person present in an environment having a doorway, local coordinates of a position where the person is detected in a local coordinate space of the environment, and a time when the person is detected, as observation information;
   a first-time detection position estimating unit for estimating a position where the person is detected for a first time within the local coordinate space, based on the feature information as to the person, the local coordinates, and the time each observed by the observer device;
   a doorway position estimating unit for estimating local coordinates of a doorway position of the doorway in the local coordinate space, based on the position where the person is detected for the first time within the local coordinate space estimated by the first-time detection position estimating unit;
   a position calibration information calculating unit for outputting position calibration information for calibration of a position of the observer device, based on global coordinates of the doorway position of the doorway in a global space of the environment and the local coordinates of the doorway position estimated by the doorway position estimating unit;
   a person detection history database that stores therein the feature information as to the person, the local coordinates of the person, and the time when the person is detected, each being the observation information acquired by the observer device; and
   a first-time detection position history database that stores therein by the first-time detection position estimating unit, the position where the person is detected for the first time in the local coordinate space as first-time detection position information, with the time when the person is detected, based on the information stored in the person detection history database,
   wherein the first-time detection position estimating unit refers to the person detection history database as to each piece of the observation information being acquired by the observer device and being associated with a detection of the person, to determine whether or not any other piece of the observation information that stores feature information identical to the feature information of the observation information is stored in the person detection history database between the time when the person is detected being the observation information and a time a prescribed time before, and when the other observation information storing the identical feature information is not stored in the person detection history database, the first-time detection position estimating unit estimates that the position where the person is detected being the observation information is the position where the person is detected for the first time, and stores the position where the person is detected for the first time in the first-time detection position history database.

2. A position calibration information collecting apparatus, comprising:
   an observer device that acquires feature information as to a person present in an environment having a doorway, local coordinates of a position where the person is detected in a local coordinate space of the environment, and a time when the person is detected, as observation information;
   a first-time detection position estimating unit for estimating a position where the person is detected for a first time within the local coordinate space, based on the feature information as to the person, the local coordinates, and the time each observed by the observer device;
   a doorway position estimating unit for estimating local coordinates of a doorway position of the doorway in the local coordinate space, based on the position where the person is detected for the first time within the local coordinate space estimated by the first-time detection position estimating unit;
   a position calibration information calculating unit for outputting position calibration information for calibration of a position of the observer device, based on global coordinates of the doorway position of the doorway in a global space of the environment and the local coordinates of the doorway position estimated by the doorway position estimating unit;
   wherein the environment map storing unit stores therein automatic door identification information that identifies whether a door at the doorway in the global space automatically opens or the door is manually opened,
   the position calibration information calculating unit calculates the position calibration information, based on the automatic door identification information stored in the environment map storing unit, by associating the door at the doorway in terms of the local coordinates and the door at the doorway in terms of the global coordinates to each other, when there exist a plurality of pairs of local coordinates of the doorway position of the doorway determined to be the doorway where the door at the doorway automatically opens based on the automatic door identification information as the position where the person is detected for the first time, the first-time detection position estimating unit determines that, out of the plurality of positions where the person is detected for the first time, a position located at farthest coordinates from central coordinates of the environment is the local coordinates of the doorway position of the doorway, and when there exist a plurality of pairs of local coordinates of the doorway position of the doorway determined to be the doorway where the door at the doorway is manually opened based on the automatic door identification information as the position where the person is detected for the first time, the first-time detection position estimating unit determines that a barycenter position of the plurality of positions where the person is detected for the first time is the local coordinates of the doorway position of the doorway.

3. A position calibration information collecting apparatus, comprising:
an observer device that acquires feature information as to a person present in an environment having a doorway, local coordinates of a position where the person is detected in a local coordinate space of the environment, and a time when the person is detected, as observation information;
a first-time detection position estimating unit for estimating a position where the person is detected for a first time within the local coordinate space, based on the feature information as to the person, the local coordinates, and the time each observed by the observer device;
a doorway position estimating unit for estimating local coordinates of a doorway position of the doorway in the local coordinate space, based on the position where the person is detected for the first time within the local coordinate space estimated by the first-time detection position estimating unit;
a position calibration information calculating unit for outputting position calibration information for calibration of a position of the observer device, based on global coordinates of the doorway position of the doorway in a global space of the environment and the local coordinates of the doorway position estimated by the doorway position estimating unit;
an environment map storing unit for storing therein the global coordinates of the doorway position of the doorway in the global space of the environment;
a person detection history database that stores therein the feature information as to the person, the local coordinates of the person, and the time when the person is detected the observation information, each being the observation information acquired by the observer device; and
a first-time detection position history database that stores therein by the first-time detection position estimating unit, the position where the person is detected for the first time in the local coordinate space as first-time detection position information, with the time when the person is detected, based on the information stored in the person detection history database, wherein the position calibration information calculating unit calculates the position calibration information for performing calibration as to the position of the observer device, based on the global coordinates of the doorway position and the local coordinates of the doorway position, using the global coordinates of the doorway position of the doorway in the global space stored in the environment map storing unit, the environment map storing unit further stores therein information as to a position where the person is likely to stay within the global space, the doorway position estimating unit further estimates a position where the person is likely to stay within the local coordinate space, based on the feature information as to the person, the local coordinates of the person, and the time when the person is detected, each being stored in the person detection history database, the first-time detection position history database stores therein by the first-time detection position estimating unit the position where the person is likely to stay within the local coordinate space with the time when the person is detected, the doorway position estimating unit estimates local coordinates of the position where the person is likely to stay in the local coordinate space, based on the position where the person is likely to stay within the local coordinate space stored in the first-time detection position history database, and the position calibration information calculating unit calculates the position calibration information for performing calibration as to the position of the observer device, based on the global coordinates of the position where the person is likely to stay and the local coordinates of the position where the person is likely to stay estimated by the doorway position estimating unit.

4. A position calibration information collecting apparatus, comprising:
an observer device that acquires feature information as to a person present in an environment having a doorway, local coordinates of a position where the person is detected in a local coordinate space of the environment, and a time when the person is detected, as observation information;
a first-time detection position estimating unit for estimating a position where the person is detected for a first time within the local coordinate space, based on the feature information as to the person, the local coordinates, and the time each observed by the observer device;
a doorway position estimating unit for estimating local coordinates of a doorway position of the doorway in the local coordinate space, based on the position where the person is detected for the first time within the local coordinate space estimated by the first-time detection position estimating unit;
a position calibration information calculating unit for outputting position calibration information for calibration of a position of the observer device, based on global coordinates of the doorway position of the doorway in a global space of the environment and the local coordinates of the doorway position estimated by the doorway position estimating unit;
an environment map storing unit for storing therein the global coordinates of the doorway position of the doorway in the global space of the environment;

a person detection history database that stores therein the feature information as to the person, the local coordinates of the person, and the time when the person is detected the observation information, each being the observation information acquired by the observer device; and a first-time detection position history database that stores therein by the first-time detection position estimating unit, the position where the person is detected for the first time in the local coordinate space as first-time detection position information, with the time when the person is detected, based on the information stored in the person detection history database, wherein the position calibration information calculating unit calculates the position calibration information for performing calibration as to the position of the observer device, based on the global coordinates of the doorway position and the local coordinates of the doorway position, using the global coordinates of the doorway position of the doorway in the global space stored in the environment map storing unit, the environment map storing unit further stores therein information as to a position where the person is inhibited from intruding, the doorway position estimating unit further estimates a position where the person is inhibited from intruding within the local coordinate space, based on the feature information as to the person, the local coordinates of the person, and the time when the person is detected, each being stored in the person detection history database, the first-time detection position history database stores therein, by the first-time detection position estimating unit, the position where the person is inhibited from intruding within the local coordinate space with the time when the person is detected, the doorway position estimating unit estimates local coordinates of the position where the person is inhibited from intruding in the local coordinate space, based on the position where the person is inhibited from intruding within the local coordinate space stored in the first-time detection position history database, and the position calibration information calculating unit calculates the position calibration information for performing calibration as to the position of the observer device, based on the global coordinates of the position where the person is likely to stay and the local coordinates of the position where the person is inhibited from intruding estimated by the doorway position estimating unit.

5. A position calibration information collecting method, comprising:

acquiring, by an observer device, feature information as to a person present in an environment having a doorway, local coordinates of a position where the person is detected in a local coordinate space of the environment, and a time when the person is detected, as observation information;

estimating, by a first-time detection position estimating unit, a position where the person is detected for a first time within the local coordinate space, based on the feature information as to the person, the local coordinates, and the time each observed by the observer device;

estimating, by a doorway position estimating unit, local coordinates of a doorway position of the doorway in the local coordinate space, based on the position where the person is detected for the first time within the local coordinate space estimated by the first-time detection position estimating unit;

outputting, by a position calibration information calculating unit, position calibration information for calibration of a position of the observer device, based on global coordinates of the doorway position of the doorway in a global space of the environment and the local coordinates of the doorway position estimated by the doorway position estimating unit;

storing in a person detection history database the feature information as to the person, the local coordinates of the person, and the time when the person is detected, each being the observation information acquired by the observer device; and storing in a first-time detection position history database by the first-time detection position estimating unit, the position where the person is detected for the first time in the local coordinate space as first-time detection position information, with the time when the person is detected, based on the information stored in the person detection history database, wherein the first-time detection position estimating unit refers to the person detection history database as to each piece of the observation information being acquired by the observer device and being associated with a detection of the person, to determine whether or not any other piece of the observation information that stores feature information identical to the feature information of the observation information is stored in the person detection history database between the time when the person is detected being the observation information and a time a prescribed time before, and when the other observation information storing the identical feature information is not stored in the person detection history database, the first-time detection position estimating unit estimates that the position where the person is detected being the observation information is the position where the person is detected for the first time, and stores the position where the person is detected for the first time in the first-time detection position history database.

6. A non-transitory computer readable medium containing computer instructions stored therein for causing a computer steps of:

acquiring, by an observer device, feature information as to a person present in an environment having a doorway, local coordinates of a position where the person is detected in a local coordinate space of the environment, and a time when the person is detected, as observation information;

estimating, by a first-time detection position estimating unit, a position where the person is detected for a first time within the local coordinate space, based on the feature information as to the person, the local coordinates, and the time each observed by the observer device;

estimating, by a doorway position estimating unit, local coordinates of a doorway position of the doorway in the local coordinate space, based on the position where the person is detected for the first time within the local coordinate space estimated by the first-time detection position estimating unit;

calculating, by a position calibration information calculating unit, position calibration information for performing calibration as to a position of the observer device, based on global coordinates of the doorway position of the doorway in a global space of the environment and the local coordinates of the doorway position estimated by the doorway position estimating unit;

storing in a person detection history database the feature information as to the person, the local coordinates of the person, and the time when the person is detected, each being the observation information acquired by the observer device; and storing in a first-time detection position history database by the first-time detection position estimating unit, the position where the person is detected for the first time in the local coordinate space as first-time detection position information, with the time when the person is detected, based on the information stored in the person detection history database, wherein the first-time detection position estimating unit refers to the person detection history database as to each piece of the observation information being acquired by the observer device and being associated with a detection of the person, to determine whether or not any other piece of the observation information that stores feature information identical to the feature information of the observation information is stored in the person detection history database between the time when the person is detected being the observation information and a time a prescribed time before, and when the other observation information storing the identical feature information is not stored in the person detection history database, the first-time detection position estimating unit estimates that the position where the person is detected being the observation information is the position where the person is detected for the first time, and stores the position where the person is detected for the first time in the first-time detection position history database.

* * * * *